(12) United States Patent
Morinaga et al.

(10) Patent No.: US 7,230,803 B2
(45) Date of Patent: Jun. 12, 2007

(54) MAGNETIC HEAD WITH MAGNETIC DOMAIN CONTROL STRUCTURE HAVING ANTI-FERROMAGNETIC LAYER AND PLURAL MAGNETIC LAYERS

(75) Inventors: Akira Morinaga, Odawara (JP); Koichi Nishioka, Hiratsuka (JP); Takayoshi Ohtsu, Oi-machi (JP); Norifumi Miyamoto, Chigasaki (JP); Shuichi Kojima, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 535 days.

(21) Appl. No.: 10/771,312

(22) Filed: Feb. 5, 2004

(65) Prior Publication Data

US 2004/0223263 A1    Nov. 11, 2004

Related U.S. Application Data

(63) Continuation-in-part of application No. 10/219,647, filed on Aug. 14, 2002, now Pat. No. 6,903,906, and a continuation-in-part of application No. 10/075,241, filed on Feb. 15, 2002, now Pat. No. 6,704,177.

(30) Foreign Application Priority Data

Oct. 22, 2001  (JP)  .............................. 2001-322952
Apr. 8, 2002  (JP)  .............................. 2002-104652

(51) Int. Cl.
*G11B 5/39*  (2006.01)

(52) U.S. Cl. ................................ 360/324.12

(58) Field of Classification Search ............ 360/324.12
See application file for complete search history.

(56) References Cited

U.S. PATENT DOCUMENTS 5,995,338 A     11/1999  Watanabe et al.
6,266,218 B1 *   7/2001  Carey et al. ............ 360/324.12

FOREIGN PATENT DOCUMENTS

| JP | 9-97409 | 4/1997 |
| JP | 2001-84531 | 3/2001 |
| JP | 2001-250205 | 9/2001 |

* cited by examiner

*Primary Examiner*—A. J. Heinz
(74) *Attorney, Agent, or Firm*—Antonelli, Terry, Stout & Kraus, LLP.

(57) ABSTRACT

A magneto-resistive effect head including: an antiferromagnetic layer; a pinned layer which is formed on the antiferromagnetic layer and whose magnetizing direction has been fixed; a spacer formed on the pinned layer; a free layer formed on the spacer; and magnetic domain control layers having antiferromagnetic films and magnet layers for performing a magnetic domain control of the free layer; wherein the each of the antiferromagnetjc films is formed on the free layer; wherein the each of magnet layers has at least two magnetic films coupled anti-ferromagnetically through at least one nonmagnetic film; a pair of lead layers for supplying a current to the stack of layers; and wherein seed layers are formed between the antiferromagnetic films and the lead layers.

18 Claims, 18 Drawing Sheets

MAGNETIC HEAD WITH MAGNETIC DOMAIN CONTROL STRUCTURE HAVING ANTI-FERROMAGNETIC LAYER AND PLURAL MAGNETIC LAYERS

CROSS-REFERENCE TO RELATED APPLICATIONS

This application is a continuation-in-part of U.S. application Ser. No. 10/219,647 filed Aug. 14, 2002 (now U.S. Pat. No. 6,903,906), entitled "MAGNETIC HEAD" by Akira MORINAGA et al. (assigned to the present assignee), and U.S. application Ser. No. 10/075,241 filed Feb. 15, 2002 (now U.S. Pat. No. 6,704,177), entitled "MAGNETORE-SISTIVE EFFECT HEAD" by Akira MORINAGA et al. (assigned to the present assignee), the disclosures of which are incorporated herein by reference.

BACKGROUND

1. Field

This invention relates to magnetoresistive heads using an magnetoresistive effect by which information is reproduced from a magnetic recording medium, and magnetic heads by which recording and reproduction are carried out.

2. Background

Usually, a magnetic head provided in a hard disk drive (HDD) includes: a writing head for writing information as a magnetization signal onto a recording medium (hard disk); and a reproducing head for reading the signal recorded as a magnetization signal on the recording medium. Since the reproducing head is constructed by a stack including a plurality of magnetic thin films and non-magnetic thin films and reads the signal by using the magneto-resistive effect, it is called a magneto-resistive effect head. There are a few kinds of stacking structures of the magneto-resistive effect head and they are classified into an AMR head, a GMR head, a TMR head, and the like in accordance with a principle of magneto-resistance which is used. More particularly, an input magnetized field entered from the recording medium into the reproducing head is extracted as a voltage change by using an AMR (Anisotropy Magneto-Resistive effect), a GMR (Giant Magneto-Resistive effect), CPP-GMR (Current Perpendicular Plane-GMR effect) or a TMR (Tunneling Magneto-Resistive effect).

In the stack layer of the reproducing head, a magnetic layer whose magnetization is rotated by receiving the input field from the recording medium is called a free layer. To suppress various noises such as a Barkhausen noise and the like or to control an asymmetry output, it is important to convert the free layer into a single domain in a track width direction. If the free layer has a magnetic domain without being converted into a single domain, the free layer receives the input magnetized field from the recording medium, so that a domain wall movement occurs and becomes a cause of noise.

As a method of the magnetic domain control for converting the free layer into the single domain, for example, as disclosed in JP-A-3-125311, there is a method whereby magnetic domain control layers including magnet layers are arranged at both ends of the free layer, and a magnetic field which is caused in the track width direction from the magnet layers is used. FIG. 8 shows a schematic diagram which is obtained when a magneto-resistive head subjected to the magnetic domain control by such a method is seen from an air bearing surface. A free layer 2 is formed via a spacer 3 over a soft magnetic layer (called a pinned layer) 4, and magnetization of the soft magnetic layer 4 has been fixed by an antiferromagnetic layer 5. A cap layer 1 is formed on the free layer 2. A width of free layer 2 is called a track width Twr. Both ends of the stack of the antiferromagnetic layer 5 are shaved from the cap layer 1 by ion milling or the like, so that a device has a trapezoidal shape when it is seen from the air bearing surface as shown in FIG. 8. A structure of the head of FIG. 8 is characterized in that magnetic domain control layers 7 including magnet layers are arranged to both ends of the device via seed layers 6. According to such a structure, a magnetization distribution of the free layer 2 is controlled by using a magnetic field which is developed from the magnetic domain control layers 7, and the free layer is converted into the single domain.

As another method of the magnetic domain control, for example, as shown in U.S. Pat. No. 4,663,685, there is a method whereby antiferromagnetic films are stacked on both ends of a free layer and an exchange coupling between the antiferromagnetic film and the free layer is used. FIG. 9 shows a schematic diagram which is obtained when a magneto-resistive effect head subjected to the magnetic domain control by such a method is seen from an air bearing surface. A structure of the head of FIG. 9 is characterized in that the free layer 2 is formed via the spacer 3 over the soft magnetic layer (called a pinned layer) 4 whose magnetization has been fixed by the antiferromagnetic layer 5, and antiferromagnetic films 12 are stacked at both ends of an upper portion of the free layer 2.

A magnetic domain control is performed by an exchange interaction which acts between the antiferromagnetic film 12 and free layer 2. The free layer 2 is formed so as to be wider than the width of track written on the recording medium and has a shape such that end regions are fixed. According to such a structure, therefore, a record is read by a portion Tw (of the free layer 2) between the antiferromagnetic films 12 (such a portion is called a sensing region). A lead layer 10 is stacked over the upper surface of the antiferromagnetic film 12 via a seed layer 11. It is not always necessary to form the seed layer 11.

As shown in JP-A-11-203634, there is also a method of stacking an antiferromagnetic layer having a uniform thickness onto the whole surface of a free layer, or the like. However, since a track width of the present head is very narrow, there is a fear that, if the whole surface of the free layer is fixed by a uniform magnetic field, sensitivity deteriorates and a magnetic domain control field of a track end portion where the magnetic domain control is particularly necessary is contrarily insufficient. As shown in JP-A-2001-84527, a method whereby a magnetic domain control layer is constructed by a stack layer of a layer of high coercivity and at least one of a ferromagnetic layer and an antiferromagnetic film has also been proposed.

Further, as proposed, for example, by Japanese Patent Laid-Open No. 282618/1997, Japanese Patent Laid-Open No. 53716/1999 or U.S. Pat. No. 5,739,990 is a system in which, to realize high reproducing output, a dead zone area, not to be used for reading, is created at the end portions of the free layer in the track in a widthwise direction by making the distance between the leads smaller than the track width of the free layer, since the magnetic orientation of the free layer is made difficult to rotate by the intensity of the magnetic fields generated by the lamination.

Each of the above magnetic domain control structures has the following problems. According to the magnetic domain control system as shown in FIG. 8 such that the magnetic domain control layers comprising the magnet layers are arranged on both sides of the free layer, since a magnetic field which is developed at an interface where the magnetic domain control layer and the free layer are come into contact with each other is too strong, a region (dead region) where the magnetization of the free layer is hard to be rotated with respect to the medium field is caused. To reduce the dead region, it is sufficient to weaken a magnetic domain control force by simply thinning the thickness of magnet layer or by another method. In case of using such a method, however, since an inconvenience such that the Barkhausen noise or an output signal instability is contrarily caused, asymmetry of an output increases, or the like occurs, the magnetic domain control force of a certain extent is necessary.

When a recording density of the recording medium is large and the track width Twr which is defined by the width of free layer is wide, since a ratio of the dead region which occupies the track width Twr is small, such an influence does not cause a large problem. However, the track width Twr is decreasing more and more in accordance with a recent extreme increase in recording density. Therefore, the ratio of the dead region which occupies the track width Twr is increasing. Unless some countermeasures are taken, it is very difficult to assure enough sensitivity of the head without deteriorating characteristics of noises or the like.

As one of the countermeasures, a method whereby an interval between leads is set to be smaller than the interval of the track width Twr and the portion of the dead region of low sensitivity is not used for reading, thereby enabling a high reproduction output to be obtained has been proposed in, for example, JP-A-9-282618 or U.S. Pat. No. 5,739,990. However, according to such a method, there is a problem such that since a magnetic domain control force which is applied to the end portion of the free layer locating under the lead is weak, a side reading increases.

According to the magnetic domain control method as shown in FIG. 9 whereby the antiferromagnetic film is arranged, since the coupling field acts only on the portion where the antiferromagnetic film and the free layer are in contact with each other, the problem of the dead region as mentioned above does not occur. It is advantageous for realization of a narrow track. However, the exchange coupling field between the antiferromagnetic film and the free layer is weaker than that in case of using the magnet layers and it is insufficient as a magnetic domain control force.

When the apparatus such as an HDD or the like operates, although the magneto-resistive effect device generates heat, the exchange field of the antiferromagnetic film is deteriorated by the heat. Therefore, a problem such that the edge region of the free layer which ought to have been fixed also has sensitivity, the side reading occurs, the record on the adjacent track is read, and an error rate deteriorates occurs.

In addition to the problems relating to the dead zone area, it becomes a significant problem that the ferromagnetic film is overlaid on an upper surface of the element. The overlaid portion of the magnetic film generates a magnetic field in the opposite direction to the magnetic domain control magnetic field, and in the magnetic domain controlling magnetic field distribution across the track width (Twr) direction of free layer 2 shown in FIG. 19, rippling occurs in the vicinity of a portion in which magnetic film 7 is disposed, at end portions of free layer 2 in the track width (Twr) direction. Together with this rippling, the magnetic field which is applied to the end portion areas of free layer 2 in the track width direction is decreased. As a result, instability of the element is increased. In addition, to suppress the instability, magnetic film 7 must be made thicker than necessary, and, as a result, a magnetic field stronger than necessary is applied over the entire free layer 2 so that sensitivity is damaged. It is difficult to eliminate the overlay of magnetic film 7 completely due to the process employed. Thus it is necessary to use ingenuity with regard to the magnetic domain control structure.

In contrast, in a magnetic domain control method in which the antiferromagnetic film is disposed as shown in FIG. 9, coupling a magnetic field affects only the portion at which the antiferromagnetic film 12 is in contact with the free layer 2; therefore, the dead zone problem does not occur, and this method is also advantageous in making narrower tracks. Further, there is no effect of the overlay of the magnetic film on the element. However, the exchange coupling magnetic field of antiferromagnetic film 12 and free layer 2 is smaller as compared with a case in which magnetic film 7 is used.

As shown in FIG. 19, it is preferred that a magnetic field does not exist in a magnetic sensing region, but the magnetic field intensity is extremely small compared with the magnetic field of the end portions in the track width (Twr) direction of free layer 2 in a case where magnetic film 7 is used. Further, when an apparatus such as HDD (hard disk drive) is in use, the exchange magnetic field of antiferromagnetic film 12 and the end portion of free layer 2 deteriorates due to heat generated by the magnetoresistive element, and the magnetic domain controlling magnetic field is further decreased. Therefore, the problem arises that the end portion area of the free layer 2, which should be fixed, has sensitivity, and read drift occurs so that the record data of an adjacent track is read and the error rate is increased. Further, there is a process problem that, because the width Tw of the magnetic sensing region increases as the effective track width is broadened, the geometric track width Twr must be made smaller.

SUMMARY

It is an object of the present invention to provide a magneto-resistive effect head capable of realizing large sensitivity and excellent side reading and noise characteristics.

According to the invention, in a magneto-resistive effect head, a magnetic domain control of a free layer is performed by using both of antiferromagnetic films and magnetic domain control layers including magnet layers. For example, the magnetic domain control is performed by arranging the magnetic domain control layers including magnet layers to both ends of a magneto-resistive effect device having a pair of antiferromagnetic films for performing the magnetic domain control of the free layer.

This structure differs from the structures of both of the foregoing prior arts. For example, in the method of JP-A-2001-84527 whereby the magnetic domain control layer is constructed by the stack of the layer of the high coercivity and at least one of the ferromagnetic layer and the antiferromagnetic film, the antiferromagnetic film is used for aligning the magnetization of the high coercivity layer in the track width direction and not used for the magnetic domain control of the free layer. Even if the high coercivity layer is used, since there is a problem of the dead region, the problem remains in case of realizing the narrow track. However, according to the construction of the invention, the problem of the dead region can be solved.

FIG. 2 shows a distribution in the track width direction of the magnetic domain control field which is applied to the free layer. In case of the magnetic domain control using only the magnet layer of case (1), a record is read out from the track width portion Twr. It will be understood that although a magnetic field in the center portion of the track width is small, the magnetic field increases as a position approaches the track end portion. There is a problem such that the sensitivity deteriorates remarkably in the track end portion.

According to the magnetic domain control using only the antiferromagnetic film of case (2), the record is read out from the sensing region Tw of the center portion of the free layer. It will be understood that a uniform magnetic domain control field is applied only to the portion on which the antiferromagnetic film is overlaid and no magnetic field is applied to the sensing region. Therefore, although the realization of high sensitivity of the device can be expected, since the exchange coupling field intensity of the antiferromagnetic film is smaller than that of the magnet layer, there is a problem such that the record is read out from the whole free layer including not only the sensing region but also the end portions. To solve those problems, therefore, a new magnetic domain control construction using the magnet layers and the antiferromagnetic films has been invented.

According to a magnetic domain control using both of the magnet layers and the antiferromagnetic films, a distribution of a magnetic domain control field as shown by a bold line of case (3) is obtained. According to this magnetic domain control, the record is read out from the sensing region Tw of center portion of the free layer. In the end portion of the free layer, since the magnetic domain control is performed by a sufficient large effective magnetic field obtained by adding the powerful magnetic domain control field of the magnet layer and the exchange coupling field of the antiferromagnetic film, the problems of the side reading, noise, and the like do not occur.

On the other hand, since the sensing region is far from the magnet layer, no dead region is caused. Since the antiferromagnetic film is effective only to the end portion, no influence is exercised on this portion. Thus, the magnetic field which is applied to the sensing region is sufficiently weak and a magneto-resistive effect head having high sensitivity can be realized. By optimizing a thickness and a saturation magnetic flux density of the magnetic domain control layer including the magnet layers and a width of antiferromagnetic layer, a magneto-resistive effect head which has high sensitivity even if a track width is narrowed and in which a noise and side reading do not occur can be realized.

In another aspect, this invention provides a magnetoresistive head and a magnetic head which have greater sensitivity and higher stability compared to related art structures having the magnetic domain controlling film with a narrowed track, but maintain the same magnetic field intensity. This invention enables a GMR, CPP-GMR or TMR head and is of a magnetic domain controlling structure in which the laminated stack adjacent to a magnetoresistive stack has at least two magnetic films coupled antiferromagnetically through a non-magnetic film. Alternatively, it provides a GMR head operating according to a magnetic domain controlling method using the exchange coupling magnetic field of an antiferromagnetic film and a free layer. It also provides a magnetic domain controlling structure in which a laminated stack disposed on the end portion areas of the free layer of the magnetoresistive stack has a magnetic film which is antiferromagnetically coupled to the free layer through a non-magnetic film.

The structure of the invention is different from the structure of the related art. The invention can solve problems such as read drift and increase of effective track width by use of antiferromagnetic coupling through non-magnetic coupling whose coupling force is far greater than that available in the existing art.

It is a further object of the present invention that a single magnetic domain control layer may be of plural layers.

Other objects, features and advantages of the invention will become apparent from the following description of the embodiments of the invention taken in conjunction with the accompanying drawings.

DESCRIPTION OF EXAMPLE EMBODIMENTS

An example embodiment of a magnetic domain control system in a magneto-resistive effect head according to the invention will be described hereinbelow with reference to the drawings.

Figure 1:
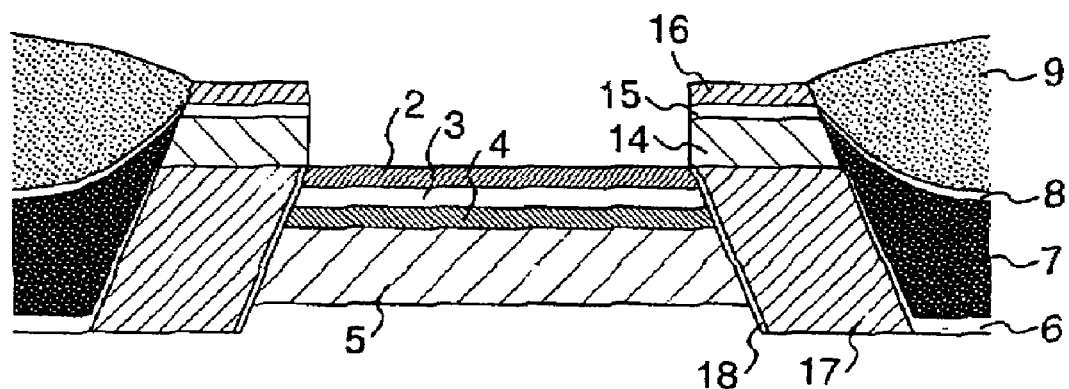
FIG. 1 is a diagram showing an example embodiment of the invention and is an example constructional diagram of a magnetic domain control using both of a magnet layer and an antiferromagnetic film.
Figure 2:
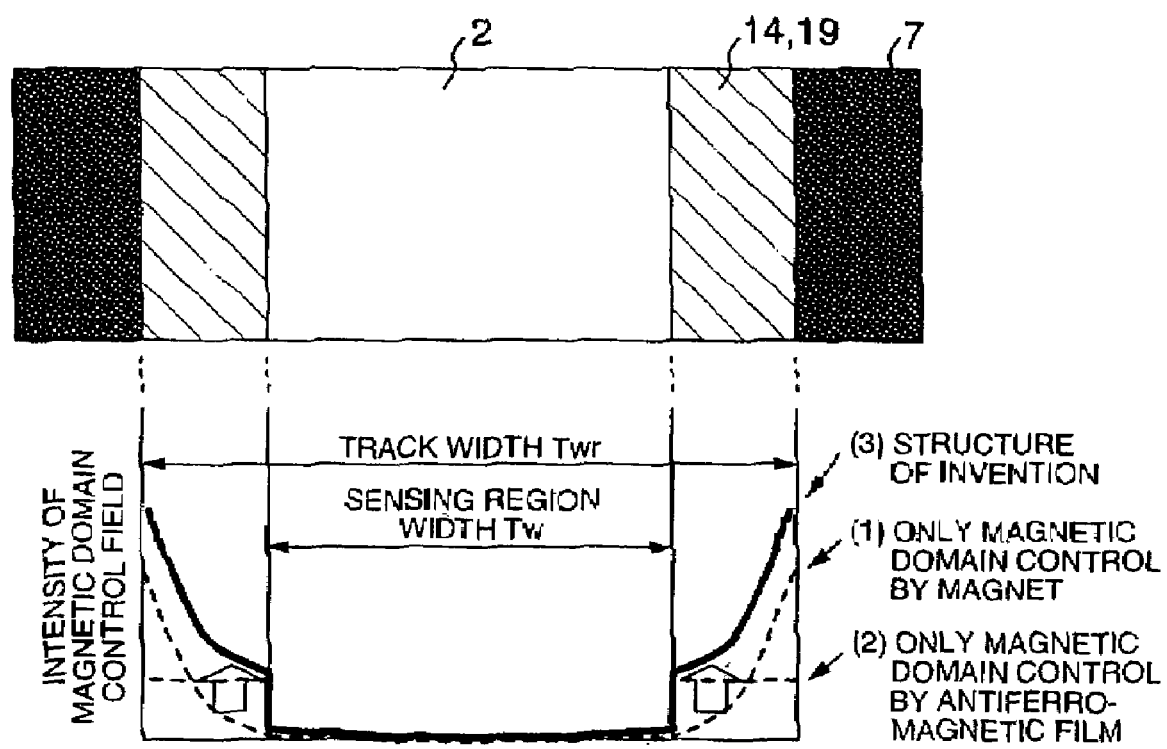
FIG. 2 is an example diagram showing a magnetic domain control field distribution in a free layer according to each of a background magnetic domain control construction and a magnetic domain control construction of the invention.

FIG. 1 shows an example diagram of an example embodiment of a magneto-resistive effect head according to the invention when it is seen from an air bearing surface. The free layer 2 is formed via the spacer 3 over the pinned layer 4 whose magnetization has been fixed by the antiferromagnetic layer 5. End portions of a stack of the free layer 2, spacer 3, pinned layer 4, and antiferromagnetic layer 5 are shaved by the ion milling or the like, so that the stack has a trapezoidal shape. A soft magnetic domain control layer 17 is arranged in an end portion of the stack via a seed layer 18. An antiferromagnetic film 14 is formed on the layer 17. The seed layer 18 is made of Ta, or it may not always be necessary to form the seed layer 18. A first lead layer 16 is arranged over the antiferromagnetic film 14 via a seed layer 15. It may not always be necessary to form the seed layer 15.

After the soft magnetic domain control layer 17 is formed, the antiferromagnetic film 14, seed layer 15, and lead layer 16 are formed on the free layer 2 and only a sensing region is removed by, for example, an RIE, an IM, or the like, so that those structures can be formed. If the antiferromagnetic film 14 is sufficiently thin, the exchange coupling with the free layer 2 does not occur. Therefore, the antiferromagnetic film 14 which is thinner than those of both end portions of the track of the free layer 2 can also remain in the sensing region of the center portion of the free layer 2 from which the record is read out.

The magnetic domain control layers 7 made of magnet layers are further arranged on both sides of the soft magnetic domain control layer 17 via the seed layers 6. As a material of the magnet layer 7, it is possible to use one of a CoPt alloy containing Pt of 4 to 30 atom %, a CoCrPt alloy containing Cr of 2 to 15 atom %, CoCrPt—$ZrO_2$, and CoCrPt—$SiO_2$. A lead 9 is arranged over the magnetic domain control layer 7 via a seed layer 8. It is not always necessary to form the seed layer 8.

Although the first lead layer 16 and second lead layer 9 are formed by different processes, both of them are finally coupled and supply a current to the magneto-resistive effect device. In case of the system of performing the magnetic domain control only by the magnetic domain control layers 7 made of the background hard magnetic magnet layers shown in FIG. 8, the magnetic field which is developed near the magnetic domain control layers 7 is very large and obstructs the magnetization rotation of the free layer 2, so that the dead regions occur in the end portions of the free layer 2.

Figure 9:
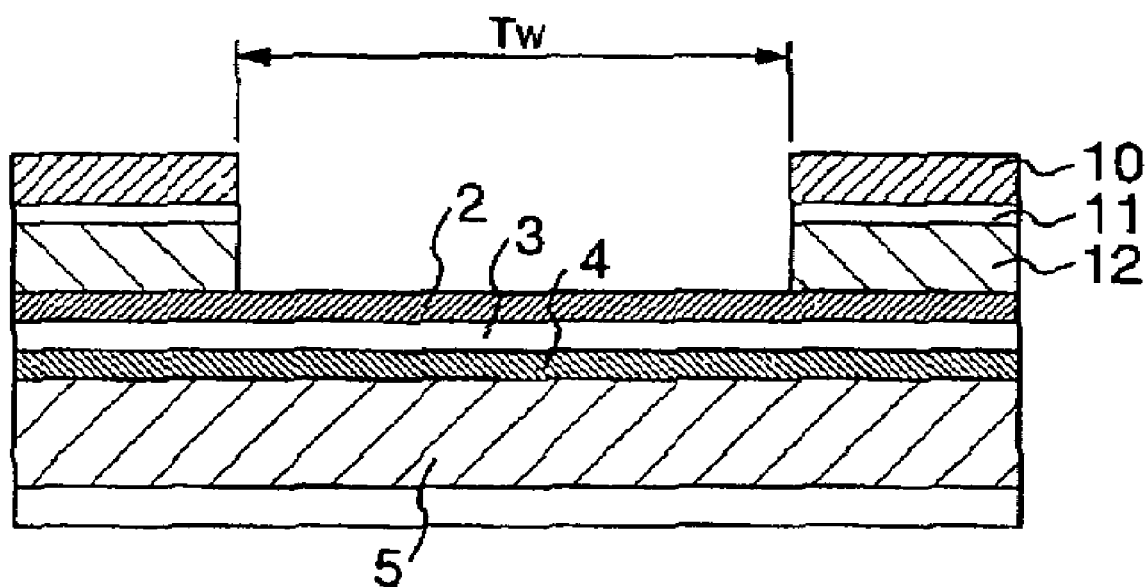
FIG. 9 is an example diagram showing a magnetic domain control construction using a conventional antiferromagnetic film.

According to the magnetic domain control using the antiferromagnetic film 12 as shown in FIG. 9, since the exchange coupling between the antiferromagnetic film 12 and free layer 2 is weak, the side reading occurs, cross talk and side reading characteristics deteriorate, and noises increase. According to the structure shown in FIG. 1, since the distance from the magnetic domain control layer 7 to the free layer 2 is increased by a length corresponding to the width of soft magnetic domain control layer 17, the dead region decreases.

The antiferromagnetic film 14 controls the magnetization of the soft magnetic domain control layer 17 in the track width direction, and the soft magnetic domain control layer 17 plays a role of a side shield. According to the structure of FIG. 1, since there is an effect such that the soft magnetic domain control layer 17 absorbs the surplus magnetic flux of an amount larger than that in FIG. 3 or 7, which will be explained hereinafter, it is presumed that a side reading Δ in Table 1, which will be explained hereinafter, decreases.

As mentioned above, by performing the magnetic domain control of the free layer 2 by simultaneously using the magnetic domain control layer 7 comprising the magnet layer and antiferromagnetic film 14, a magneto-resistive effect head having large sensitivity and excellent side reading and noise characteristics can be realized.

Figure 3:
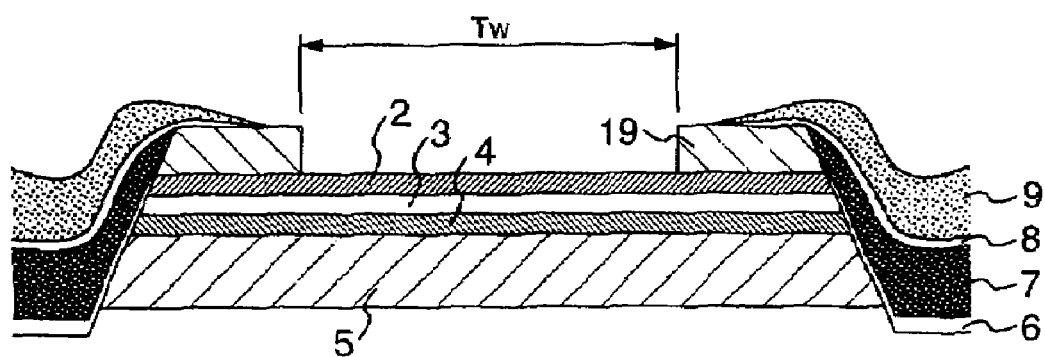
FIG. 3 is an example constructional diagram showing another example embodiment of the invention.

FIG. 3 shows another example embodiment of a magneto-resistive effect head according to the invention in the case where it is seen from an air bearing surface. The free layer 2 is formed via the spacer 3 including a conductor such as copper over the pinned layer 4 whose magnetization has been fixed by the antiferromagnetic layer 5. Although antiferromagnetic films 19 are arranged on the free layer 2, it is desirable that the antiferromagnetic film 19 exists only in a region of a specific length of the track end portion of the free layer 2. The antiferromagnetic film 19 is formed by a method whereby, for example, after the free layer 2 is stacked, the antiferromagnetic film 19 is stacked on the whole surface of the free layer 2, a resist is formed in a portion where it is desired to leave the antiferromagnetic film 19, and a sensing region portion is shaved by the ion milling or the like.

If the antiferromagnetic film 19 is sufficiently thin, the exchange coupling with the free layer 2 does not occur. Therefore, the antiferromagnetic film 19 thinner than those of both end portions of the track of the free layer 2 can also remain in the sensing region of the center portion of the free layer 2 where the record is read out. The end portions of the stack of the antiferromagnetic layer 5, pinned layer 4, spacer 3, free layer 2, and antiferromagnetic film 19 are shaved by the ion milling or the like, so that the stack has a trapezoidal shape. The magnetic domain control layers 7 made of the magnet layers are arranged at the end portions of the stack via the seed layers 6 and the lead layers 9 are arranged over the magnetic domain control layers 7 via the seed layers 8, respectively. It is also possible that the seed layers are not formed. The lead layers 9 are more advantageous if they overlap the antiferromagnetic films 19 because a device resistance can be reduced.

In a manner similar to the first embodiment mentioned above, as a material of the magnet layer 7, it is possible to use one of the CoPt alloy containing Pt of 4 to 30 atom %, CoCrPt alloy containing Cr of 2 to 15 atom %, CoCrPt—$ZrO_2$, and CoCrPt—$SiO_2$. In case of the system of performing the magnetic domain control by the background magnet layers 7 shown in FIG. 8, the magnetic field which is developed near the magnet layer 7 is very large and may obstruct the rotation of the magnetization of the free layer 2, so that a wide dead region occurs and the sensitivity of the device is deteriorated.

According to the magnetic domain control using the antiferromagnetic films 12 as shown in FIG. 9, since the exchange coupling between the antiferromagnetic film 12 and free layer 2 is weak, the side reading occurs, the cross talk and side reading characteristics deteriorate, and the noise characteristics deteriorate. According to the structure shown in FIG. 3, the dead region near the magnetic domain control layers 7 is not used for reading the record. If the distance between the antiferromagnetic films 19 existing at the right and left end portions of the free layer 2 is short or if the antiferromagnetic films 19 are coupled, the record is read out from the sensing region Tw which is defined by the portion corresponding to the thin antiferromagnetic film 19 in the center portion of the free layer 2, so that the sensitivity is raised.

Figure 4:
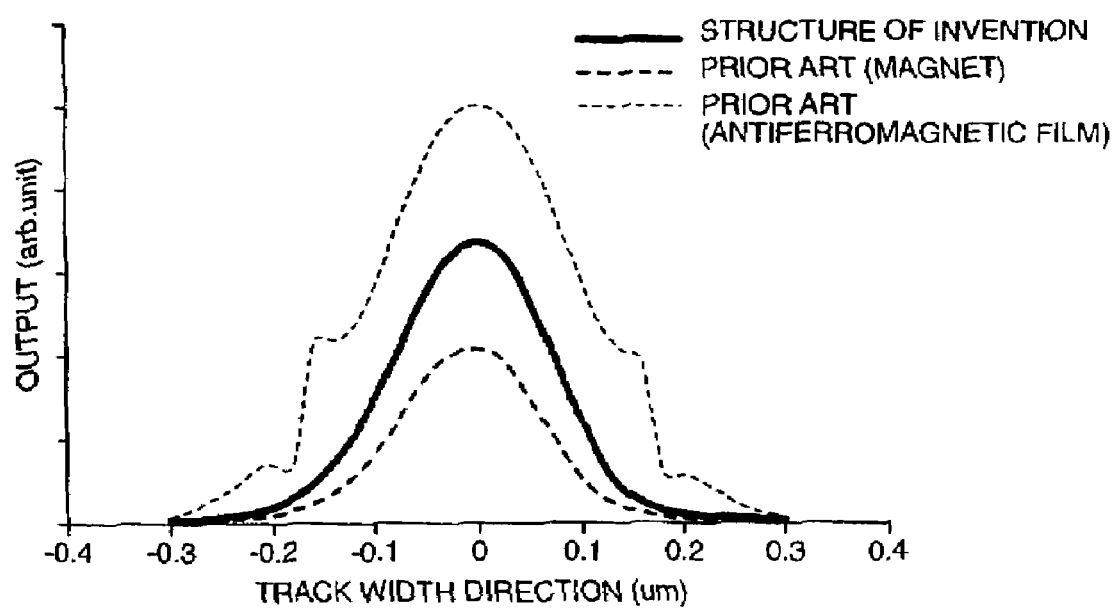
FIG. 4 is an example diagram showing an example micro track profile of each of a background structure and a structure of the invention.

As shown in FIG. 9, since shortage of the exchange coupling field in case of performing the magnetic domain control only by the antiferromagnetic films 12 is supplemented by the magnetic domain control field from the magnetic domain control layers 7, the problems of the side reading and noises are also solved. FIG. 4 shows example calculation results of micro track profiles in the case where the magnetic domain control is performed by the magnetic domain control layers comprising the magnet layers 7 shown in FIG. 8, the case where the magnetic domain control is performed only by the antiferromagnetic films 12 shown in FIG. 9, and the case where the magnetic domain control is performed by the structure of the invention, respectively.

The micro track profile shows an output change of the device which is caused when the head is moved in the track width direction over a track having a micro width (micro track), that is, it shows sensitivity in the track width direction of the head. Generally, a value of the micro track profile of the track end portion is small because the sensitivity is low and a value of the micro track profile of the track center portion is large because the sensitivity is high. The micro track profile is normalized and its half amplitude pulse width is obtained. This half amplitude pulse width is defined as an effective track width Twr50. The micro track profile is integrated and normalized, and a width between the positions of 5% and 95% of the resultant normalized value is obtained. This width is defined as a magnetic track width Twr5–95%. Generally, the larger a difference Δ between Twr5–95% and Twr50 is, the larger the side reading is. If the side reading is large, the records on the adjacent tracks which inherently do no need to be read out are read, so that a problem such that an error rate deteriorates occurs.

It is now assumed that the track width Twr of the system of performing the magnetic domain control by the magnet layers, the width of the system of performing the magnetic domain control only by the antiferromagnetic films, and the width of sensing region Tw of the free layer according to the invention are equal to 180 nm. It is now assumed that the width of micro track is equal to 10 nm, a saturation magnetic flux density of the magnet layer is equal to 1.0T, and the exchange coupling by the antiferromagnetic film is equal to 79577 A/m (=1,000 Oe).

When referring to FIG. 4, although the output in case of performing the magnetic domain control only by the antiferromagnetic films is largest, undulation is seen on the profile, and the profile is asymmetric with respect to the right and left. In case of performing the magnetic domain control only by the magnet layers, although the shape of the profile is smooth and symmetric with respect to the right and left, the output is small. Table 1 is a comparison table of the effective track width Twr50, the magnetic track width Twr5–95%, the difference Δ=(Twr5–95%−Twr50) between them, and the normalized output.

TABLE 1

|  | Twr50 (nm) | Twr5–95% (nm) | Δ (nm) | Normalized output |
| --- | --- | --- | --- | --- |
| Structure of invention | 176 | 242 | 66.3 | 1.8 |
| Prior art (magnet) | 160 | 228 | 67.9 | 1.0 |
| Prior art (antiferromagnetic films) | 226 | 317 | 90.1 | 3.3 |

According to the magnetic domain control only by the antiferromagnetic films, it will be understood that although the output is very large, the side reading is larger than the ordinary one by 20 nm or more, and the magnetic domain control power is insufficient.

According to the construction of the invention, in spite of the fact that the output that is 1.8 times as large as that of the magnetic domain control system using the magnet layers is obtained, the difference Δ=(Twr5–95%−Twr50) between the magnetic track width and the effective track width is not widened but narrowed. This means that the dead region decreases.

Figure 5:
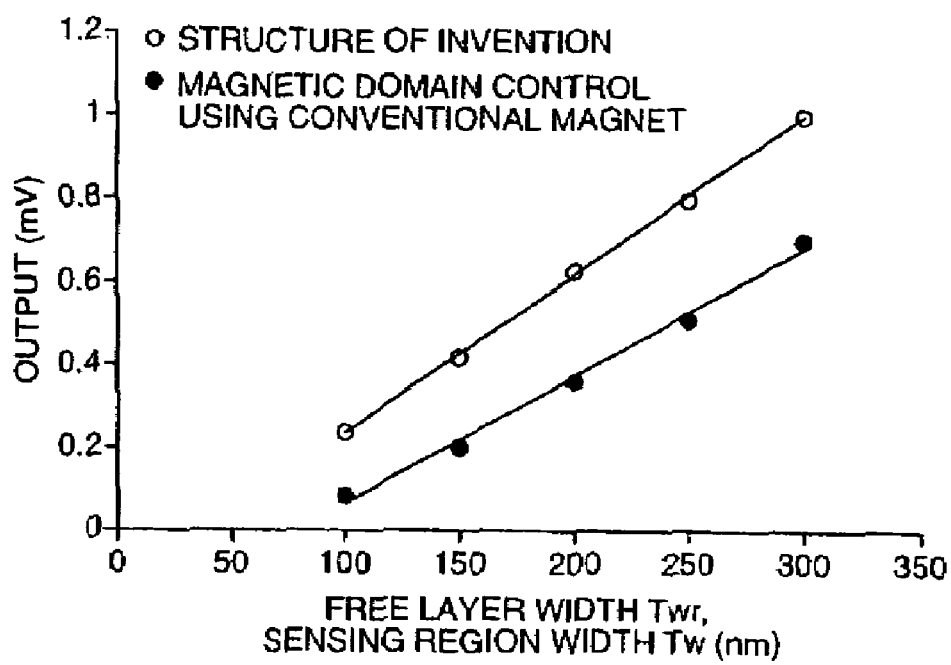
FIG. 5 is an example diagram showing dependency of an output on a track width and a sensing region width of each of a background structure and a structure of the invention.

FIG. 5 shows example calculation results of the output changes caused when the track width Twr of the free layer and the width Tw of the sensing region change in the magnetic domain control layer using the magnet layers and the construction of the invention, respectively. In each width, the output according to the construction of the invention is larger than that of the magnetic domain control layer using the magnet layers.

Figure 6:
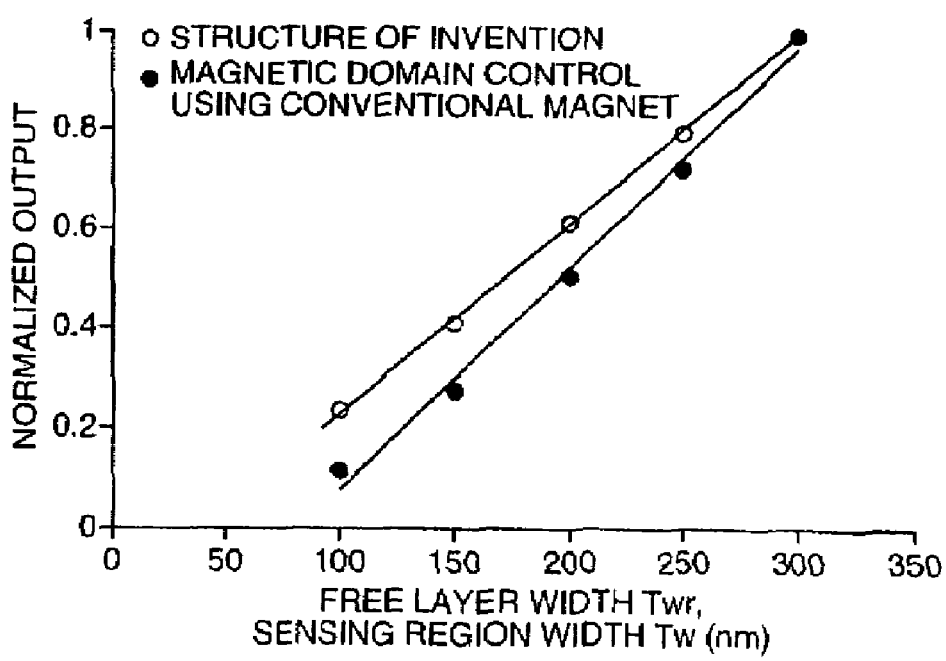
FIG. 6 is an example diagram showing dependency of a normalized output on a track width and a sensing region width of each of a background structure and a structure of the invention.

FIG. 6 shows an example graph obtained by normalizing the output by setting the case where the track width Twr or the width Tw of the sensing region is equal to 300 nm to a reference. It will be understood that a decreasing ratio of the output in association with the reduction of the track width according to the invention is smaller than that in case of the magnetic domain control layers using the magnet layers. This means that the invention is hard to be influenced by the dead region as compared with the background structure using the magnet layers. By performing the magnetic domain control of the free layer 2 by using both of the magnetic domain control layers 7 comprising the magnet layers and the antiferromagnetic films 19 as mentioned above, a magneto-resistive effect head having large sensitivity and excellent side reading and noise characteristics can be realized.

Figure 7:
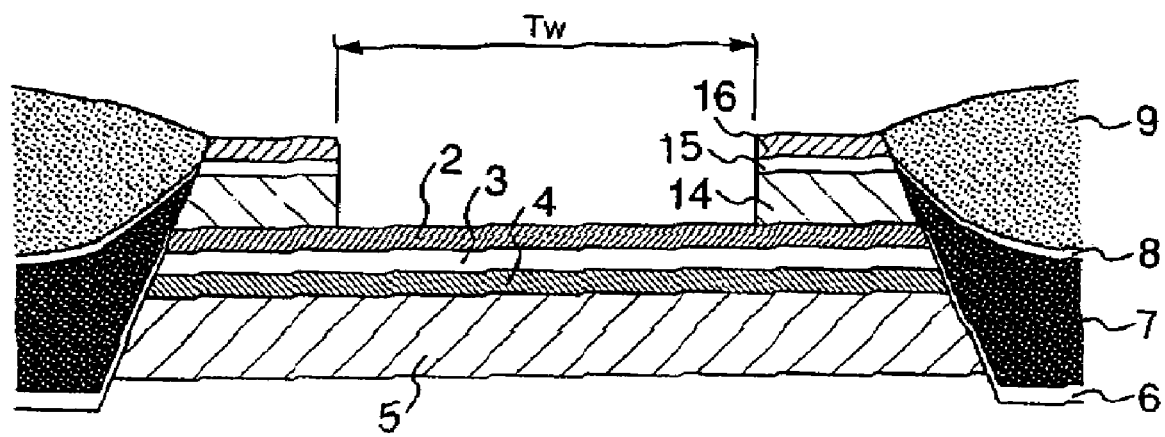
FIG. 7 is an example constructional diagram showing another embodiment of the invention.

FIG. 7 shows another example embodiment of a magneto-resistive effect head according to the invention which is obtained when it is seen from an air bearing surface. The free layer 2 is formed via the spacer 3 including a conductor such as copper over the pinned layer 4 whose magnetization has been fixed by the antiferromagnetic layer 5. Although antiferromagnetic films 14 are arranged on the free layer 2, it is desirable that the antiferromagnetic film 14 exists only in a region of a specific length of the track end portion of the free layer. The first lead layers 16 are stacked over the antiferromagnetic films 14 via the seed layers 15. It may not always be necessary to form the seed layers 15.

As a forming method, for example, the antiferromagnetic film 14, seed layer 15, and lead layer 16 are sequentially stacked on the free layer 2 and the lead layer 16 in the sensing region is removed by the RIE or the like. The remaining lead layers are used as masks, the ion milling is performed, and the antiferromagnetic film in the sensing region is removed, thereby forming.

If the antiferromagnetic film is sufficiently thin, the exchange coupling with the free layer does not occur. Therefore, the antiferromagnetic film which is thinner than that of the track portion of the free layer, can also remain in the sensing region of the center portion of the free layer from which the record is read out.

A resist is further formed on the stack of the antiferromagnetic layer 5, pinned layer 4, spacer 3, free layer 2, antiferromagnetic films 14, seed layers 15, and lead layers 16 as mentioned above, and the end portions are shaved by the ion milling or the like, thereby shaping the stack in a trapezoidal shape. The magnetic domain control layers 7 comprising the magnet layers are arranged in the end portions of the stack via the seed layers 6. The second lead layers 9 are arranged over the magnetic domain control layers 7 via the seed layers 8. It is not always necessary to form the seed layers 8.

In a manner similar to the first and second embodiments mentioned above, as a material of the magnet layer 7, it is possible to use one of the CoPt alloy containing Pt of 4 to 30 atom %, CoCrPt alloy containing Cr of 2 to 15 atom %, CoCrPt—$ZrO_2$, and CoCrPt—$SiO_2$.

Although the first lead layer 16 and second lead layer 9 are formed by different processes, both of them are finally coupled and supply a current to the magneto-resistive effect device. Since it is sufficient that the lead layer 9 is in contact with the lead layer 16, an influence by the overlap amount of the lead layer 9 is not large, so that the structure of a large process margin is obtained.

Figure 8:
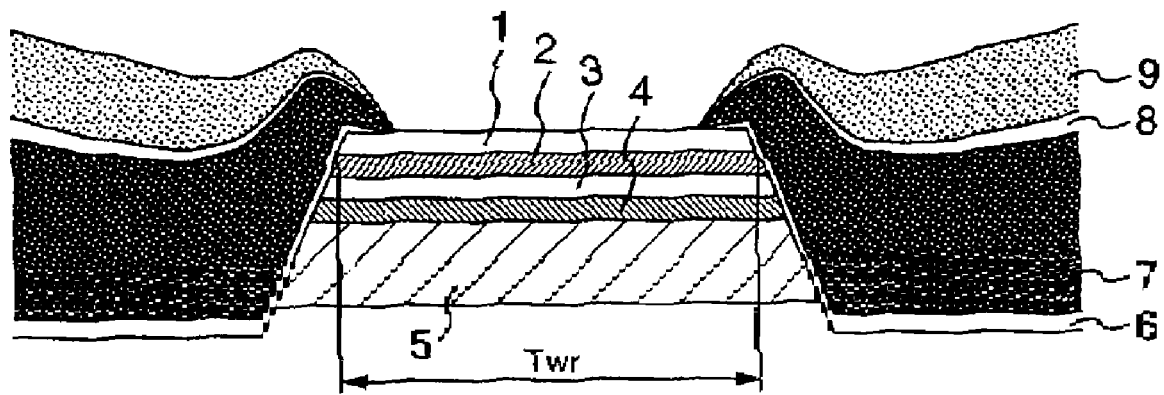
FIG. 8 is an example diagram showing a magnetic domain control construction using a conventional magnet layer.

In case of the system of performing the magnetic domain control by the background magnet layers 7 shown in FIG. 8, the magnetic field which is developed near the magnet layers 7 is very large and may obstruct the magnetization rotation of the free layer 2, so that the wide dead regions occur and the sensitivity of the device deteriorates.

According to the magnetic domain control using the antiferromagnetic film 12 as shown in FIG. 9, since the exchange coupling between the antiferromagnetic film 12 and free layer 2 is weak, the side reading occurs, cross talk and side reading characteristics deteriorate, and noise characteristics deteriorate. According to the structure shown in FIG. 7, since the dead region near the magnetic domain control layer 7 is not used for reading but the record is read out from the right and left antiferromagnetic films 14 or the sensing region Tw that is defined by the portion corresponding to the thin antiferromagnetic film, the sensitivity rises.

As shown in FIG. 9, since the shortage of the exchange coupling field in case of performing the magnetic domain control only by the antiferromagnetic films is supplemented by the magnetic domain control field from the magnetic domain control layers 7, the problems of the side reading and noises are also solved. According to the structure of FIG. 7, characteristics as shown in FIGS. 4, 5, and 6 shown in the previous embodiment are obtained. As mentioned above, by performing the magnetic domain control of the free layer 2 by using both of the magnetic domain control layers 7 comprising the magnet layers and the antiferromagnetic films 14, a magneto-resistive effect head having large sensitivity and excellent side reading and noise characteristics can be realized.

By using the magnetic domain control construction of the free layer of the magneto-resistive effect head according to the invention, even for the realization of the narrow track, as compared with the device of the magnetic domain control construction using the background magnet layers, a magneto-resistive effect head having large sensitivity and excellent side reading and noise characteristics can be realized.

Figure 10:
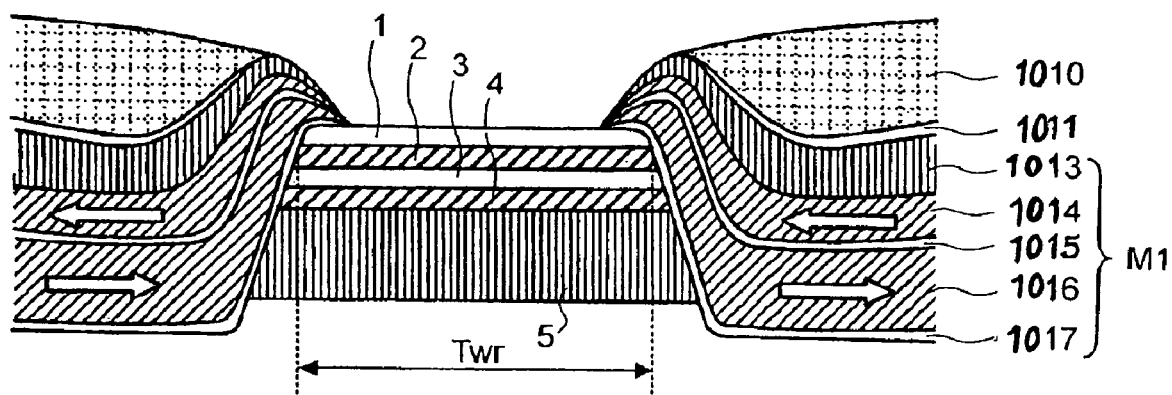
FIG. 10 is an example cross-sectional view of an example GMR magnetoresistive element according to another embodiment of the invention.

FIG. 10 is a cross-sectional view of a GMR element according to another embodiment of the invention. First, magnetic orientation of a pinned layer 4 is fixed by an antiferromagnetic body 5. On pinned layer 4, is disposed a non-magnetic layer 3 which is made of, for example, Cu, having a thickness of about 20.ANG. A free layer 2 whose magnetic orientation is rotated by the magnetic field previously input is disposed thereon. A cap layer 1 is disposed is disposed on free layer 2 to prevent oxidization of the free layer. The end portions of the magnetoresistive stack, which comprises layers 1, 2, 3, 4 and 5, are shaved off, for example, by ion milling, so that the magnetoresistive stack is trapezium-shaped.

At both end portions of the stack, a magnetic film 1016 is disposed with an underlying seed layer 1017 between the magnetic film and the stack, and a magnetic film 1014 is further disposed with another non-magnetic film 1015 between the two magnetic films. The magnetic orientation of magnetic film 1014 is fixed in one direction by an antiferromagnetic film 1013. It is, however, noted that this antiferromagnetic film 1013 may be eliminated, for example, by proper selection of the material and thickness of the magnetic film and the non-magnetic film which is disposed between magnetic films to meet conditions of magnetization and other factors. The lead 1010 is disposed on a second seed layer 1011 overlying the antiferromagnetic film. This seed layer 1011 may be eliminated. A lamination stack M1 consisting of layers 1013–1017 carries out magnetic domain control of free layer 2.

It is preferable that magnetic films 1014 and 1016 contain Fe or Ni, and are soft magnetic films. Magnetic films 1016 and 1014 are antiferromagnetically coupled through non-magnetic film 1015. In order to couple magnetization of magnetic films 1014 and 1016 in an anti-parallel manner as shown by the white arrows in the figure, it is preferable that non-magnetic film 1015 is one material or an alloy of materials selected from the group Ru, Cr, Ir, Rh, Os, Re, Au, Ag, Cu and that the thickness of this non-magnetic film is less than 10 ANG.

Magnetic film 1014 may finally be magnetized in the opposite direction to the magnetic domain controlling magnetic field and magnetization may be aligned to this direction by antiferromagnetic film 1013, in which case magnetic film 1016 close to the magnetoresistive stack is controlled by antiferromagnetic coupling so that magnetic domain control becomes possible. In addition, if it is desired that free layer 2 have a right-sided magnetic orientation, as shown by the lower white arrow in the figure, the difference of magnetization in magnetic films 1014 and 1016, which are anti-parallel, can be made to go to the right side by using a thick material for magnetic film 1016 that has a stronger magnetic field for magnetic domain control than magnetic film 1014, or by making the film thickness magnetic film 1016 greater than that magnetic film 1014 if the same material is used for both magnetic films 1014 and 1016.

Since magnetic film 1016 is a soft magnetic film which contains Fe or Ni, there is an advantage that magnetic orientation at the end portion of the free layer is easy to rotate and the sensitivity of the MR head is increased as compared to the related art magnetic domain controlling method comprising only a ferromagnetic film.

Further, when controlling is carried out by changing the thickness of a non-magnetic film in such a manner that antiferromagnetic coupling force is maintained but weakened, the magnetic orientation of magnetic films 1014 and 1016 is made to move around in such a manner that it absorbs magnetic fluxes from multiple directions, and therefore, it becomes possible that magnetic films 1014 and 1016 function as side shields. Thus, it is possible to prevent flow of extra fluxes into the free layer from end portions of a track or adjacent tracks in the recording state, which is unstable, and so this is advantageous in making a track narrower.

Further, when an antiferromagnetic coupling force is strengthened by making a lamination of magnetic films 1016 and 1014 with non-magnetic film 1015 between them, as in this embodiment, the magnetic domain controlling film M1 is stabilized and is less easily influenced by heat.

Figure 11:
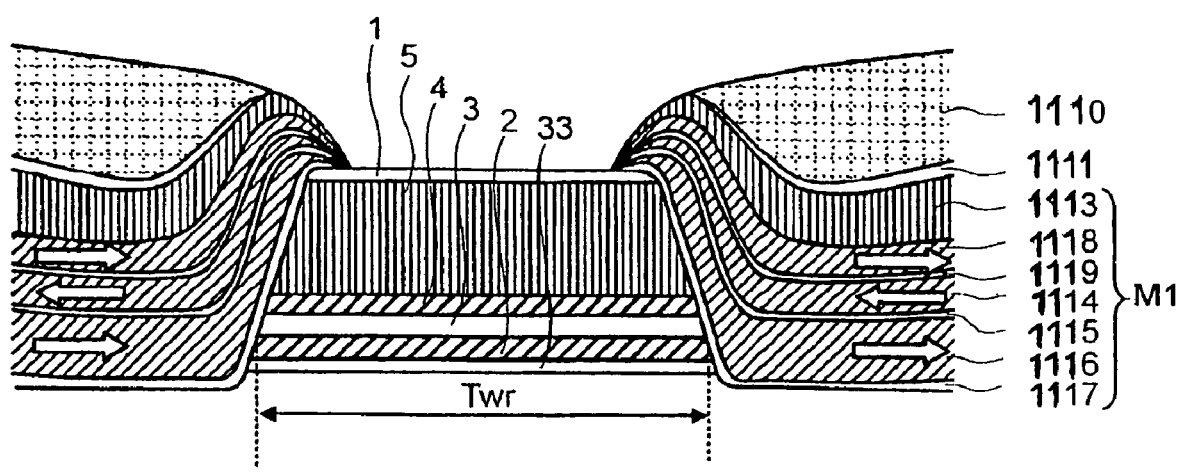
FIG. 11 is an example cross-sectional view of an example GMR magnetoresistive element according to another embodiment of the invention.

FIG. 11 shows an example cross-sectional view of an example GMR element according to the invention. Free layer 2, whose magnetic orientation is rotated by the previously input magnetic field, is disposed on a seed layer 33. A non-magnetic layer 3 made of Cu, for example, is disposed on free layer 2, and has a thickness of about 20 ANG. Pinned layer 4, whose magnetic orientation is fixed by the antiferromagnetic body 5, is disposed on non-magnetic layer 3. Cap film 1 is disposed on pinned layer 4 to for prevent oxidization. End portions of a magnetoresistive stack of 1, 2, 3, 4, 5 and 33 are shaved off, for example, by ion milling so that the magnetoresistive stack is trapezoid-shaped.

At both end portions of the stack, which comprises 1–5 and 33, magnetic film 1116 is disposed with an underlying seed layer 1117 between the film and the stack, and magnetic film 1114 is disposed on non-magnetic film 1115 layered between magnetic films 1114 and 1116. A non-magnetic film 1119 is disposed on magnetic film 1114, and a magnetic film 1118 is further disposed on non-magnetic film 1119. An antiferromagnetic film 1113 for fixing magnetic orientation of the magnetic film 1118 in one direction is disposed on magnetic film 1118. It is, however, noted that this antiferromagnetic film 1113 may be eliminated, for example, by properly selecting the material and thickness of the magnetic film and the non-magnetic film which is disposed between magnetic films to meet the conditions of magnetization. The lamination stack M1 of 1113–1119 carries out magnetic domain control of the free layer 2. Further included are a lead 1110 formed on an optional seed layer 1111.

It is preferable that magnetic films 1114, 1116 and 1118 contain Fe or Ni, and are soft magnetic films. Magnetic films 1116 and 1114 and magnetic films 1114 and 1118 are antiferromagnetically coupled through the non-magnetic films 1115 and 1119, respectively. To couple magnetic films 1114 and 1116 and magnetic films 1114 and 1118 in an anti-parallel manner as shown by the white arrows in the figure, it is preferable that each of non-magnetic films 1115 and 1119 is an alloy of one or more materials selected from the group of Ru, Cr, Ir, Rh, Os, Re, Au, Ag, Cu, and that the thickness of these non-magnetic films is less than 10 ANG.

When magnetic film 1118 is finally magnetized in the same direction as the magnetic domain controlling magnetic field is applied or magnetization is aligned in this direction by antiferromagnetic film 1113, magnetic film 1114 is coupled in anti-parallel thereto. Then, magnetic film 1116 nearest to the magnetoresistive stack is coupled in anti-parallel manner and controlled by the magnetic domain control so that magnetic domain control of free layer 2 becomes possible. In addition, in this embodiment, the MR head is constructed such that the antiferromagnetic body for aligning magnetic orientation of the pinned layer is disposed on the free layer in the magnetoresistive stack, but similar advantages may be obtained even when the structure of the invention is applied to an MR head constructed such that the antiferromagnetic body for fixing magnetic orientation of the pinned layer is disposed under the free layer in the magnetoresistive stack.

Further, when the total film thickness of this embodiment and that a prior discussed embodiment are the same, the laminated stack of the magnetic films alternating with the non-magnetic films in this embodiment has more layers than the prior embodiment, so that the film thickness of each magnetic film layer is reduced, and since antiferromagnetic intensity increases in reverse proportion to film thickness, coupling force in the lamination is strengthened and stabilized. As a result, the advantage that the laminated stack of this embodiment is less easily influenced by heat is also obtained.

On the other hand, even when more magnetic films are laminated with non-magnetic films in this embodiment than is done in the prior embodiment, and film thickness is increased by just the thickness of magnetic film 1118, compared to the composition of the prior embodiment, the quality of the magnetic film as a side shield can be improved.

Figure 12:
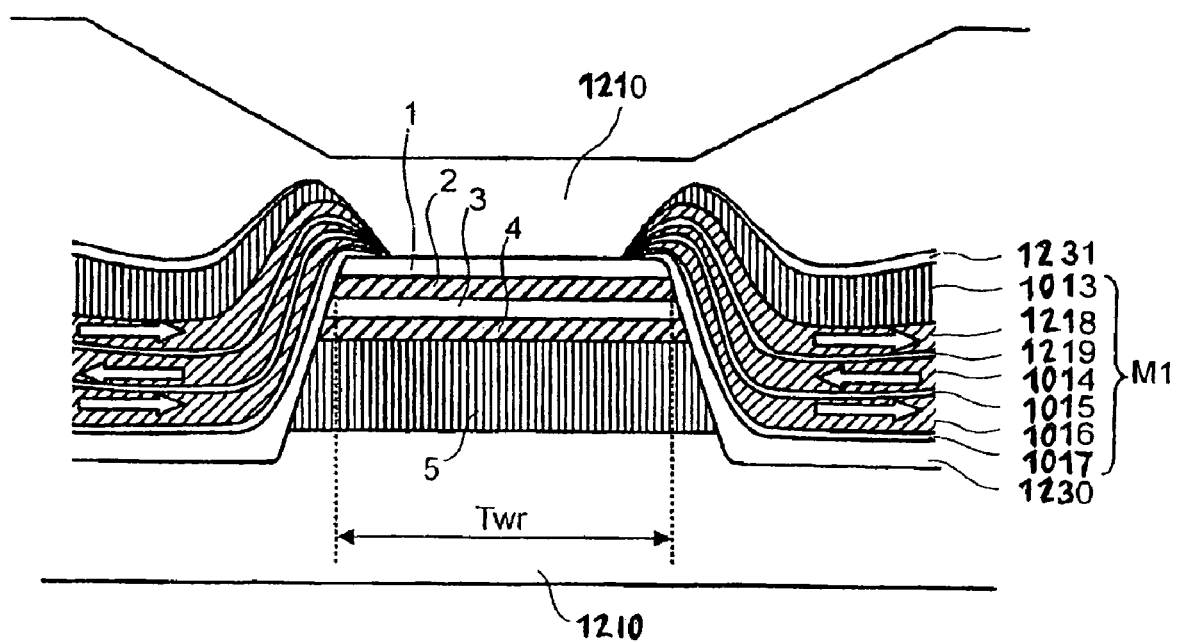
FIG. 12 is an example cross-sectional view of an example CPP-GMR magnetoresistive element from the side according to another embodiment of the invention.

FIG. 12 shows an example cross-sectional view of an example CPP-GMR element according to the invention. Layers 1, 2, 3, 4, 5, 1013, 1014, 1015, 1016 and 1017 shown in FIG. 12 are the same as in the structure of the embodiment shown in FIG. 10. Further, the leads 1210 are disposed so as to sandwich the stack which comprises 1, 2, 3, 4 and 5.

At both end portions of the stack which comprises 1–5, an insulating layer 1230 is disposed, with seed layer 1017 overlying the insulating layer, and magnetic layers 1016 and 1014 are disposed with non-magnetic film 1015 between them. Nonmagnetic film 1219 is disposed on magnetic film 1014, and magnetic film 1218 is imposed on non-magnetic film 1219. An antiferromagnetic film 1013 for fixing the magnetic orientation of the magnetic film 1218 in one direction is disposed on magnetic film 1218. It is, however, noted that this antiferromagnetic film 1013 may be eliminated, for example, by properly selecting the material and thickness of the magnetic film and the non-magnetic film which is disposed between magnetic films to meet the conditions of magnetization. The lamination stack M1 of 1013, 1014, 1015, 1016, 1017, 1218, 1219 carries out magnetic domain control of free layer 2. Further, an insulating layer 1231 is built up on lamination stack M1. This insulating layer 1231 may be eliminated.

It is preferable that magnetic films 1014, 1016 and 1218 are soft magnetic films which contain Fe or Ni. Magnetic films 1016 and 1014 and magnetic films 1014 and 1018 are antiferromagnetically coupled through non-magnetic films 1015 and 1019, respectively. In order to couple the magnetization of magnetic films 1014 and 1016 and magnetic films 1014 and 1218 in an anti-parallel manner as shown by the white arrows in the figure, it is preferable that each of non-magnetic films 1015 and 1219 is one material or an alloy of materials selected from the group of Ru, Cr, Ir, Rh, Os, Re, Au, Ag, Cu and that the thickness of these non-magnetic films is less than 10 ANG.

When magnetic film 1218 is finally magnetized in the same direction as the magnetic domain controlling magnetic field is applied, and magnetization in this direction has been achieved by the antiferromagnetic film 1013, magnetic film 1014 is coupled to magnetic film 1218 in anti-parallel manner. Further, magnetic film 1016, which is nearest to the magnetoresistive stack, is coupled in an anti-parallel manner and its magnetic domains are controlled so that magnetic domain control of free layer 2 becomes possible even in CCP-GMR.

Figure 13:
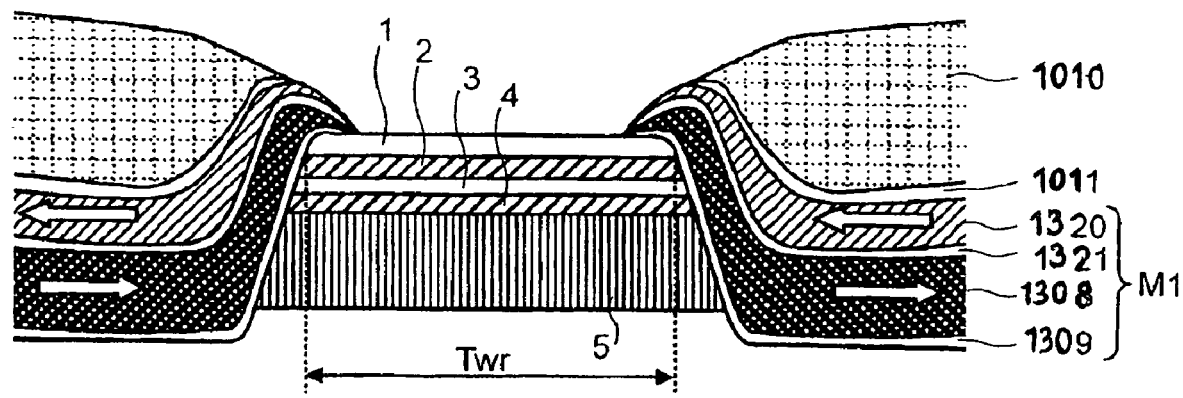
FIG. 13 is an example cross-sectional view of an example GMR magnetoresistive element according to another embodiment of the invention.

FIG. 13 shows a cross-sectional view of a GMR element according to the invention. Layers 1, 2, 3, 4, 5, 1010 and 1011 shown in FIG. 13 are the same as in the structure of the embodiment shown in FIG. 10.

At both end portions of the stack, which comprises 1–5, a magnetic film 1308 is disposed with a seed layer 1309 between the magnetic film and the stack, and a magnetic film 1320 is further disposed with a non-magnetic film 1321 between magnetic films 1308 and 1320. Lead 1010 is disposed on seed layer 1011, which is disposed on magnetic film 1320. The seed layer 1011 may be eliminated. The lamination stack M1, which comprises 1308, 1309, 1320 and 1321, carries out magnetic domain control of free layer 2.

It is preferable that magnetic film 1308 is a ferromagnetic film which is a CoPt alloy wherein the atomic percentage of Pt is 4–30%, or a CoCrPt alloy or CoCrPt—ZrO2 or CoCrPt—SiO2 wherein the atomic percentage of Cr is 2–15%. Further, it is preferable that the magnetic film is a soft magnetic film which contains Fe or Ni. Magnetic films 1308 and 1320 are coupled antiferromagnetically through non-magnetic film 1321. In order to couple magnetic films 1308 and 1320 in an anti-parallel manner as shown by the white arrows in the figure, it is preferable that non-magnetic film 1321 is one material or an alloy of materials selected from the group of Ru, Cr, Ir, Rh, Os, Re, Au, Ag, Cu and that the thickness of this non-magnetic film is less than 10 ANG.

When the soft magnetic film is overlaid on the magnetoresistive stack, there is a drawback that, since magnetic field generated from the overlaid portion goes in the opposite direction to that of the magnetic field for magnetic domain control, the magnetic field for magnetic domain control at the end portions of the free layer is reduced. When magnetic film 1320 is deposited to be antiferromagnetically coupled with magnetic film 1308 through nonmagnetic film 1321 and the respective directions of the magnetic fields for magnetic domain control in magnetic films 1308 and 1320 are made in anti-parallel, the extra magnetic fluxes at the overlaid portion of magnetic film 1308 are sent back to magnetic film 1320 so that the problem can be solved.

Further, if antiferromagnetic coupling intensity is weakened by varying the thickness of the non-magnetic film to the extent that the anti-parallel state of magnetization in both sides is not broken up, the magnetic permeability in the vertical direction of the element can be secured and magnetic film 1320 can be used as a side shield.

In addition, the same advantages can be also obtained when this embodiment is applied to CPP-GMR and TMR heads.

Figure 14:
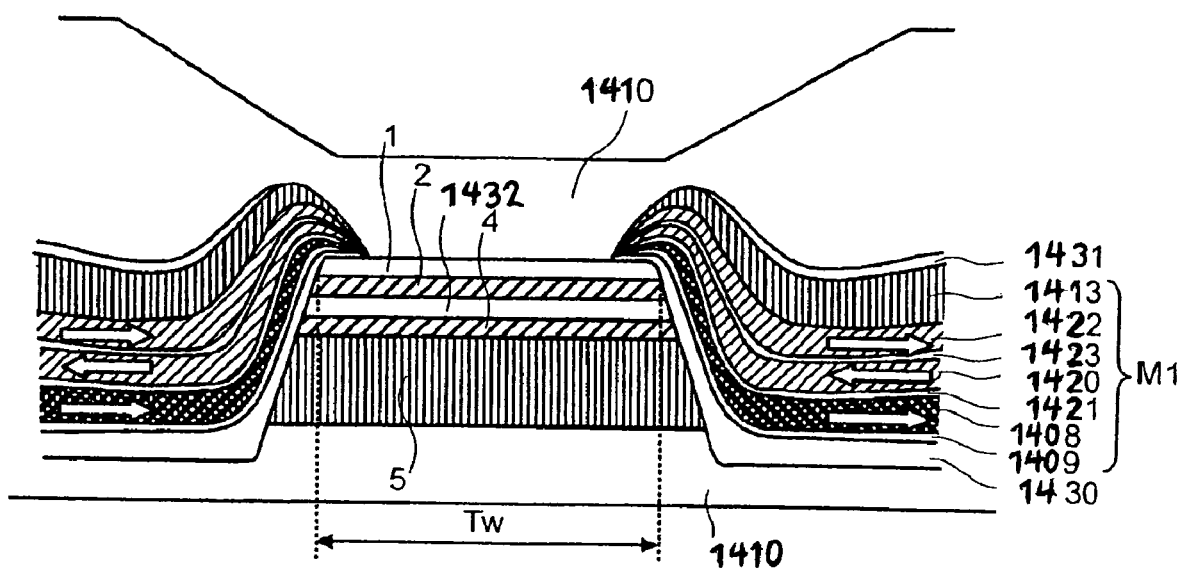
FIG. 14 is an example cross-sectional view of an example TMR magnetoresistive element according to another embodiment of the invention.

FIG. 14 shows an example cross-sectional view of an example TMR element according to the invention. The layers with corresponding numbers shown in FIG. 14 are the same as in the structure of the embodiment shown in FIG. 10. In this embodiment, instead of the non-magnetic layer 3 shown in FIG. 1, an insulator 1432 is disposed on the pinned layer 4, and on the insulator 1432, is disposed free layer 2, whose magnetic orientation is rotated by the previously input magnetic field. Further, the leads 1410 are disposed so as to sandwich the stack which comprises 1, 2, 1432, 4 and 5.

At both end portions of the stack, an insulator 1430 is disposed, and magnetic film 1408 is disposed with seed layer 1409 between the magnetic film and the stack. Non-magnetic film 1421 is then disposed between magnetic film 1408 and magnetic film 1420. A magnetic film 1422 is further disposed with a non-magnetic film 1423 between magnetic film 1420 and magnetic film 1422. Antiferromagnetic film 1413 is disposed on magnetic film 1422, and magnetic orientation control of this magnetic film is carried out, but antiferromagnetic film 1413 may be eliminated, for example, by properly selecting the material and thickness of the magnetic film and the non-magnetic film which is disposed between magnetic films to meet the conditions of magnetization. The lamination stack M1, which comprises 1408, 1409, 1413 and 1420–1423, carries out magnetic domain control of free layer 2. Further, insulator 1431 is built up on lamination stack M1. This insulator 1431 may be eliminated.

It is preferable that magnetic film 1408 is a CoPt alloy wherein the atomic percentage of Pt is 4–30% or a CoCrPt alloy or CoCrPt—ZrO2 or CoCrPt—SiO2 wherein the atomic percentage of Cr is 2–15%. Further, it is preferable that magnetic films 1420 and 1422 are soft magnetic films which contain Fe or Ni. Magnetic films 1408 and 1420 and magnetic films 1420 and 1422 are coupled antiferromagnetically through non-magnetic films 1421 and 1423, respectively. To couple the magnetic films in an anti-parallel manner as shown by the white arrows in the figure, it is preferable that each of nonmagnetic films 1421 and 1423 is one material or an alloy of materials selected from the group of Ru, Cr, Ir, Rh, Os, Re, Au, Ag, Cu and that the thickness of these non-magnetic films is less than 10 ANG.

When the magnetic film is finally magnetized in the same direction as the magnetic field for magnetic domain control is applied and magnetization is aligned in this direction by antiferromagnetic film 1413, magnetic film 1420 is coupled in anti-parallel to the coupled magnetic films, and, further, if the magnetic film nearest to the magnetoresistive stack is coupled in an anti-parallel manner and magnetic domain control is carried out, magnetic domain control of free layer 2 becomes possible even with a TMR element.

In addition, when the total film thickness of the magnetic films in this embodiment and a prior embodiment are the same, the film thickness of each magnetic film layer is reduced, since there are more magnetic films laminated with non-magnetic films in this embodiment, and since antiferromagnetic intensity is increased in reverse proportion to film thickness, coupling force in the lamination is strengthened and stabilized. As a result, this embodiment has the further advantage that it is less easily influenced by heat.

On the other hand, even when, as in this embodiment, more magnetic films are laminated with the non-magnetic films as compared to the prior embodiment, and the film thickness is increased by just the thickness of magnetic film 1422 as compared to the structure of the prior embodiment, the function of the magnetic film as a side shield can be improved. These advantages can be obtained in a similar manner even when the structure of this embodiment is applied to GMR and CPP-GMR, not only to TMR.

Figure 15:
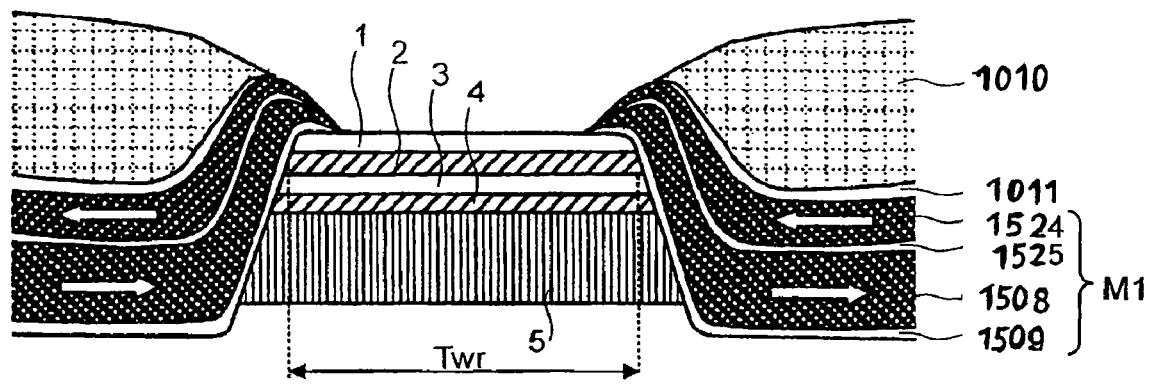
FIG. 15 is an example cross-sectional view of an example GMR magnetoresistive element according to another embodiment of the invention.

FIG. 15 is a cross-sectional view of a GMR element according to the invention. Layers 1, 2, 3, 4, 5, 1010 and 1011 shown in FIG. 15 are the same as in the structure of the embodiment shown in FIG. 10.

At both end portions of the stack which comprises 1–5, magnetic film 1508 is disposed with seed layer 1509 between the magnetic film and the stack, and a magnetic film 1524 is further disposed with a non-magnetic film 1525 between magnetic film 1508 and magnetic film 1524. Lead 1010 is disposed with seed layer 1011 between magnetic layer 1524 and the lead. This seed layer 1011 may be eliminated.

The lamination stack M1 of 1508, 1509, 1524 and 1525 carries out magnetic domain control of free layer 2. When this embodiment is used with CPP-GMR and TMR, an insulating film, which is made, for example, of aluminum, is disposed between M1 and the magnetoresistive stack, and the leads 1010 are disposed on and under M1 in contact with the magnetoresistive stack.

It is preferable that magnetic film 1508 is a CoPt alloy wherein the atomic percentage of Pt is 4–30%, or a CoCrPt alloy or CoCrPt—ZrO2 or CoCrPt—SiO2 wherein the atomic percentage of Cr is 2–15%. Since magnetic films 1508 and 1525 are ferromagnetic, as compared to a case where the magnetic film is a soft magnetic film, magnetic orientation is stabilized and magnetic domain control of the free layer may be carried out by a strong magnetic field.

Further, magnetic films 1508 and 1524 are coupled anti-ferromagnetically through nonmagnetic film 1525. In order to couple magnetization of magnetic films 1508 and 1524 in an anti-parallel manner as shown by the white arrows in the figure, it is preferable that nonmagnetic film 1525 is one material or an alloy of materials selected from the group of Ru, Cr, Ir, Rh, Os, Re, Au, Ag, Cu and that the thickness of this nonmagnetic film 1525 is less than 10 ANG.

Normally, when magnetic film having hard magnetism is overlaid on a magnetoresistive stack, there occurs a drawback that the magnetic field for magnetic domain control at end portions of the free layer is reduced, because magnetic fluxes generated from the overlaid portion are magnetized in a direction opposite to that of the magnetic field for magnetic domain control. When magnetic film 1524 is antiferromagnetically laminated on magnetic film 1508 through nonmagnetic film 1525, and the directions to which the respective magnetic fields for magnetic domain control of the magnetic films 1508 and 1524 are applied are made in anti-parallel, the extra magnetic fluxes at the overlaid portion of magnetic film 1508 are sent back to magnetic film 1524 so that the problem can be solved.

In this embodiment, the magnetic domain controlling force from the macroscopic viewpoint becomes the difference of thickness of magnetic film chemical deposits of magnetic films 1508 and 1524. In addition, when the total film thickness of magnetic films 1508 and 1524 is too great, the distance between magnetic shields is broadened and high resolution is not obtained. In such a case, it is necessary to reduce the total film thickness while maintaining the magnetic domain controlling force by appropriately changing the material that is used for the respective magnetic films.

In the case presented in this embodiment and in the related art shown in FIG. 8, the same material is used as the magnetic material, and total thickness of the magnetic film is the same, and the magnetic domain controlling force is the same. The magnetic field is increased in the structure of this embodiment since rippling at the end portions of the free layer is reduced so that stability of the output of the magnetoresistive head is increased. Further, since magnetic field gradient is also increased and the magnetic field for magnetic domain control in the free layer is reduced, the sensitivity of the magnetoresistive head is increased. Because the magnetic films are coupled antiferromagnetically through non-magnetic films, this lamination stack M1 is stable.

In addition, in the case of a related art magnetic domain controlling system in which magnetic domain control is carried out by one layer of the ferromagnetic film, as film thickness is reduced to increase sensitivity, film thickness at the straight portion is not maintained near end portions since end portions of the magnetoresistive stack have a large angle because they have been shaved off, for example, by milling. As a result, a variation of magnetic domain controlling force occurs which causes increased instability. When the magnetic domain controlling force is derived from the difference between two layers with thick ferromagnetic films, it is possible to reduce the variation of the magnetic domain controlling force.

In addition, even when this embodiment is applied to CPP-GMR and TMR heads, similar advantages may be obtained.

Figure 20:
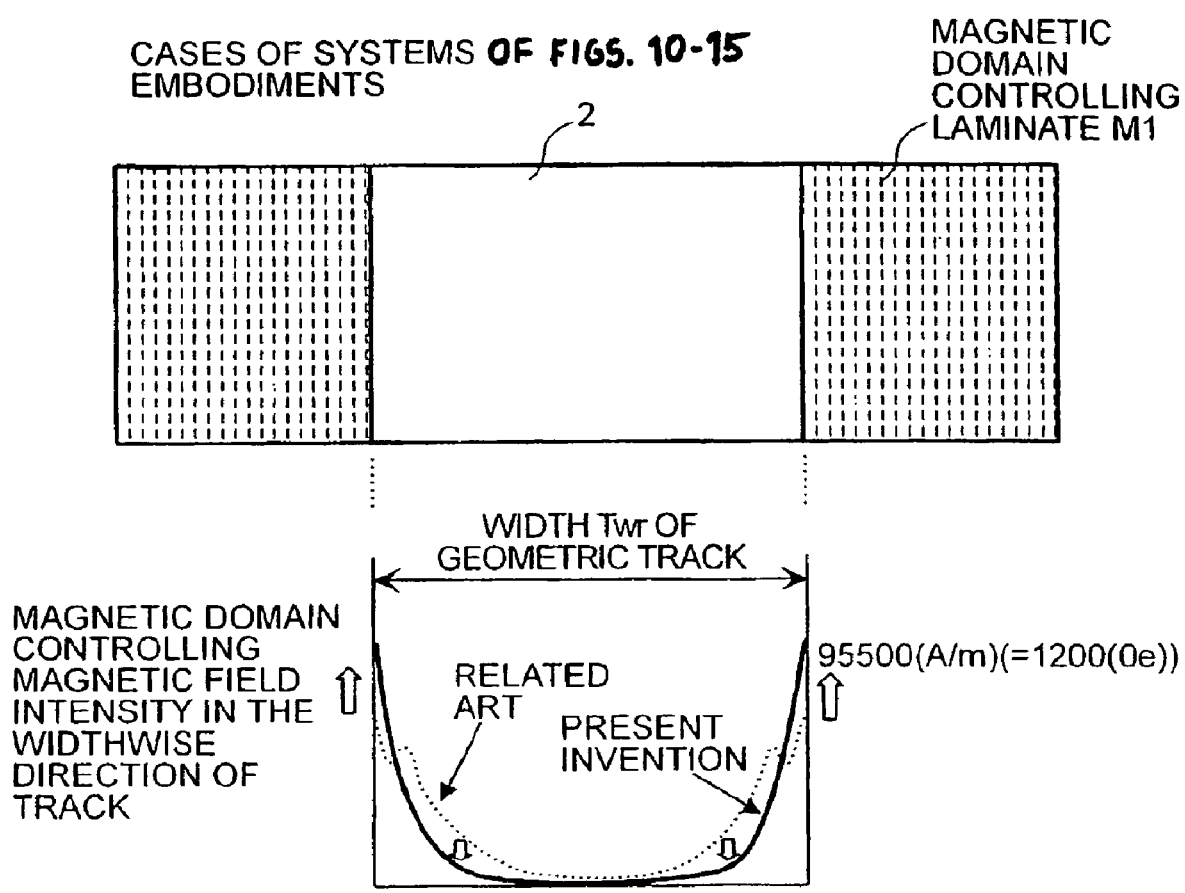
FIG. 20 is an example view explaining an aspect in which magnetic field distribution for magnetic domain control is improved at a free layer position in a magnetic domain controlling structure of the invention.

FIG. 20 shows an aspect in which magnetic field distribution for magnetic domain control is improved at the free layer position of the magnetoresistive head to which lamination stack M1 of the magnetic domain controlling structure of the FIGS. 10–15 embodiments is applied. When rippling of the magnetic field at the end portions in the track width Twr direction of free layer 2 is reduced, the magnetic field is increased, and magnetic field intensity is greater than the magnetic field intensity of the related art 95500(.ANG./m) (=1200 (Oe)) shown in FIG. 8, and the stability of the output of the magnetoresistive head is increased. Moreover, the magnetic field gradient is increased; the magnetic field for magnetic domain control in the free layer 2 is reduced; and, therefore, the sensitivity of the magnetoresistive head is increased. Since the ferromagnetic film and the magnetic film are antiferromagnetically coupled through the nonmagnetic film, this lamination stack M1 is very stable.

Figure 16:
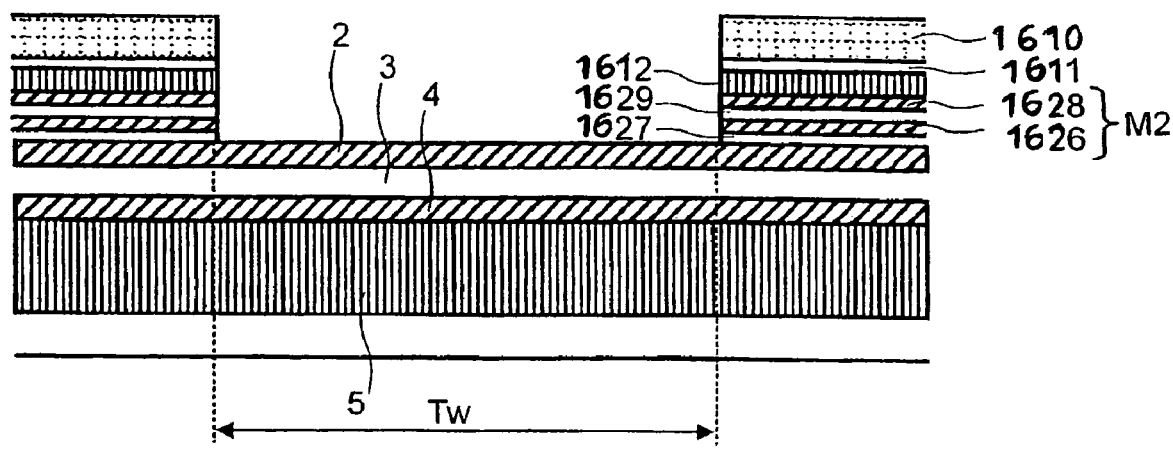
FIG. 16 is an example cross-sectional view of an example GMR magnetoresistive element to which magnetic domain controlling method using an antiferromagnetic film is applied according to another embodiment of the invention.

FIG. 16 shows an example cross-sectional view of an example GMR element according to the invention. First, magnetic orientation of the pinned layer 4 is fixed by antiferromagnetic body 5. On this pinned layer 4, the nonmagnetic layer 3 is disposed and disposed thereon is the free layer 2 whose magnetic orientation is rotated by an input magnetic field. On the free layer 2, there is a lamination which comprises a magnetic film and a nonmagnetic film, and it is preferable that this lamination exist only at an area of particular length on track end portions of the free layer 2.

A nonmagnetic layer 1627 is disposed on free layer 2. The lamination has a magnetic film 1626 which is disposed on nonmagnetic layer 1627 and a magnetic film 1628 which is further disposed with a nonmagnetic film 1629 between magnetic films 1626 and 1628. On magnetic film 1628, an antiferromagnetic film 1612 is deposed for fixing the magnetic orientation of magnetic film 1628 in the same direction the free layer 2. The lamination from this nonmagnetic film 1627 to antiferromagnetic film 1612 is called lamination stack M2. It is, however, noted that this antiferromagnetic film 1612 may be eliminated, for example, by properly selecting the material and the film thickness of a magnetic material and a nonmagnetic film which are disposed between magnetic films to meet the conditions of magnetization. A seed layer 1611 is disposed on this lamination and the lead 1610 is disposed thereon. Seed film 1611 may be eliminated.

It is preferable that each of magnetic films 1626 and 1628 is a soft magnetic film which contains Fe or Ni. It is preferable that each of nonmagnetic films 1627 and 1629 is one material or an alloy of materials selected from the group of Ru, Cr, Ir, Rh, Os, Re, Au, Ag, Cu.

As a method for making this lamination, for example, on free layer 2, nonmagnetic film 1627, magnetic film 1626, nonmagnetic film 1629, magnetic film 1628, antiferromagnetic film 1612, seed film 1611 and lead 1610 are laminated in sequence. The lead and laminates over the sensing region are removed by RIE (reactive ion etching), with nonmagnetic film 1627 used as a stopper film. At this point, when nonmagnetic film 1627 stays thinly on the sensing region, there are adverse effects on head characteristics.

In the case of a related art system in which magnetic domain control is carried out in magnetic film 7, as shown in FIG. 8, the magnetic field generated near the magnetic film 7 is very large and it prevents magnetic rotation of the free layer so that a wide dead zone is produced and the sensitivity of the element is reduced. Further, in the case of magnetic domain control using the antiferromagnetic film shown in FIG. 9, read drift occurs since exchange coupling between the antiferromagnetic film and the free layer is weak, and phenomena such as crosstalk and side-read occur, and noise worsens.

In contrast thereto, in the embodiment shown in FIG. 16, magnetization of both end portions of free layer 2 is fixed by antiferromagnetic coupling of magnetic layers 1626 and 1628 through nonmagnetic layers 1627 and 1629. This antiferromagnetic coupling is quite large compared with coupling of antiferromagnetic film 3 and free layer 2 in the related art, and therefore, no problem of read drift occurs. Further, since the ferromagnetic film is not primarily used, there is no case where magnetization rotation of end portions of free layer 2 is prevented.

Figure 21:
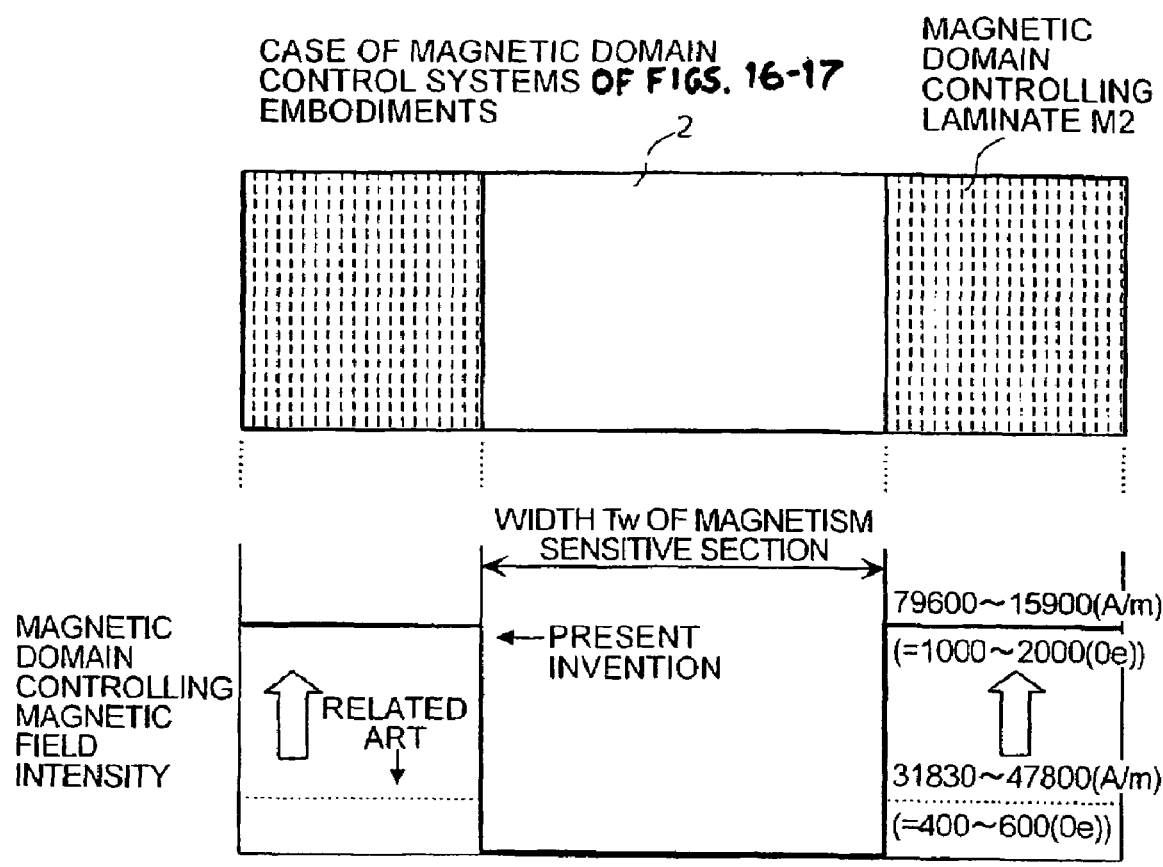
FIG. 21 is an example view explaining an aspect in which magnetic field distribution for magnetic domain control is improved at the free layer position in a magnetic domain controlling structure of the invention.

FIG. 21 shows a magnetic field distribution for magnetic domain control. Since a magnetic field is not applied to the magnetic sensing region Tw of free layer 2, sensitivity is increased, and the controlling magnetic field generated from the lamination stack M2 at both end portions of the magnetic sensing region is 79600–15900(.ANG./m)(=1000-200-0 (Oe)) as compared with controlling magnetic field intensity 318300–47800(.ANG./m)(=400-600 (Oe)) of the related art structure shown in FIG. 9 so that stability is improved.

Herewith, even in case of a GMR magnetoresistive element of a structure called patterned exchange, used is the lamination stack M2 in which magnetic layers are antiferromagnetically coupled with nonmagnetic layers between them, and magnetic domain control of the free layer 2 is carried out more strongly by antiferromagnetic coupling as compared with the related art, and thereby, it is possible to realize a magnetoresistive head which has little read drift and little noise while maintaining high sensitivity.

Figure 17:
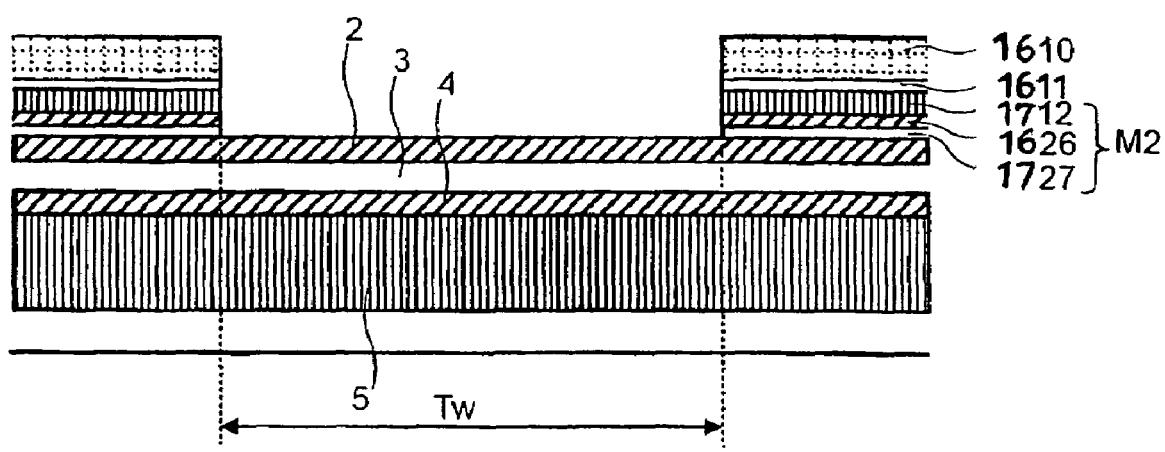
FIG. 17 is an example cross-sectional view of an example GMR magnetoresistive element to which magnetic domain controlling method using an antiferromagnetic film is applied according to another embodiment of the invention.

FIG. 17 shows a cross-sectional view of a GMR magnetoresistive element according to the invention. Layers 2, 3, 4, 1610, 1611 and 1626 shown in FIG. 17, are the same as in the structure of a prior embodiment shown in FIG. 16. In this embodiment, nonmagnetic film 1727 is laminated to free layer 2, and magnetic film 1626 is laminated on nonmagnetic film 1727. On magnetic film 1626, an antiferromagnetic film 1712 is disposed for fixing the magnetic orientation of magnetic film 1626 in the opposite direction to that of free layer 2. The lamination from nonmagnetic film 1727 to antiferromagnetic film 1712 is called lamination stack M2. It is, however, noted that antiferromagnetic film 1712 may be eliminated, for example, by properly selecting the material and thickness of a magnetic film and a nonmagnetic film which is disposed between magnetic films to meet the conditions of magnetization. A method for making this lamination stack M2 is similar to that described in the FIG. 16 embodiment.

It is preferable that magnetic film 1626 is a soft magnetic film which contains Fe or Ni. It is preferable that nonmagnetic film 1727 is one material or an alloy of materials selected from the group of Ru, Cr, Ir, Rh, Os, Re, Au, Ag, Cu.

With this embodiment, even when one magnetic film 1626 is simply laminated over the free layer 2 in a GMR element of a structure called patterned exchange, it becomes possible for magnetic domain control of free layer 2 to be carried out by a large magnetic domain controlling magnetic field created by antiferromagnetic coupling.

Figure 18:
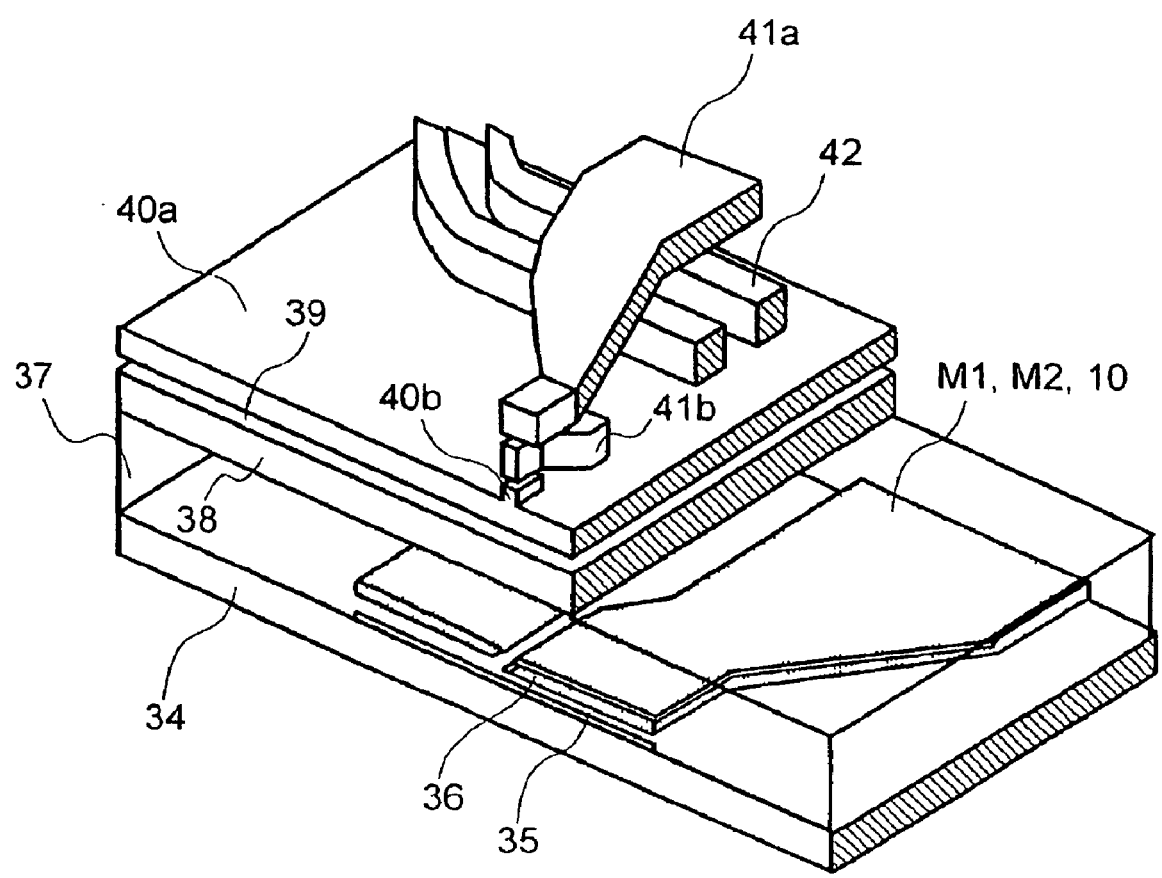
FIG. 18 is an example view of a magnetic head in which an example reproducing head having a magnetic domain controlling structure of the invention is incorporated.
Figure 19:
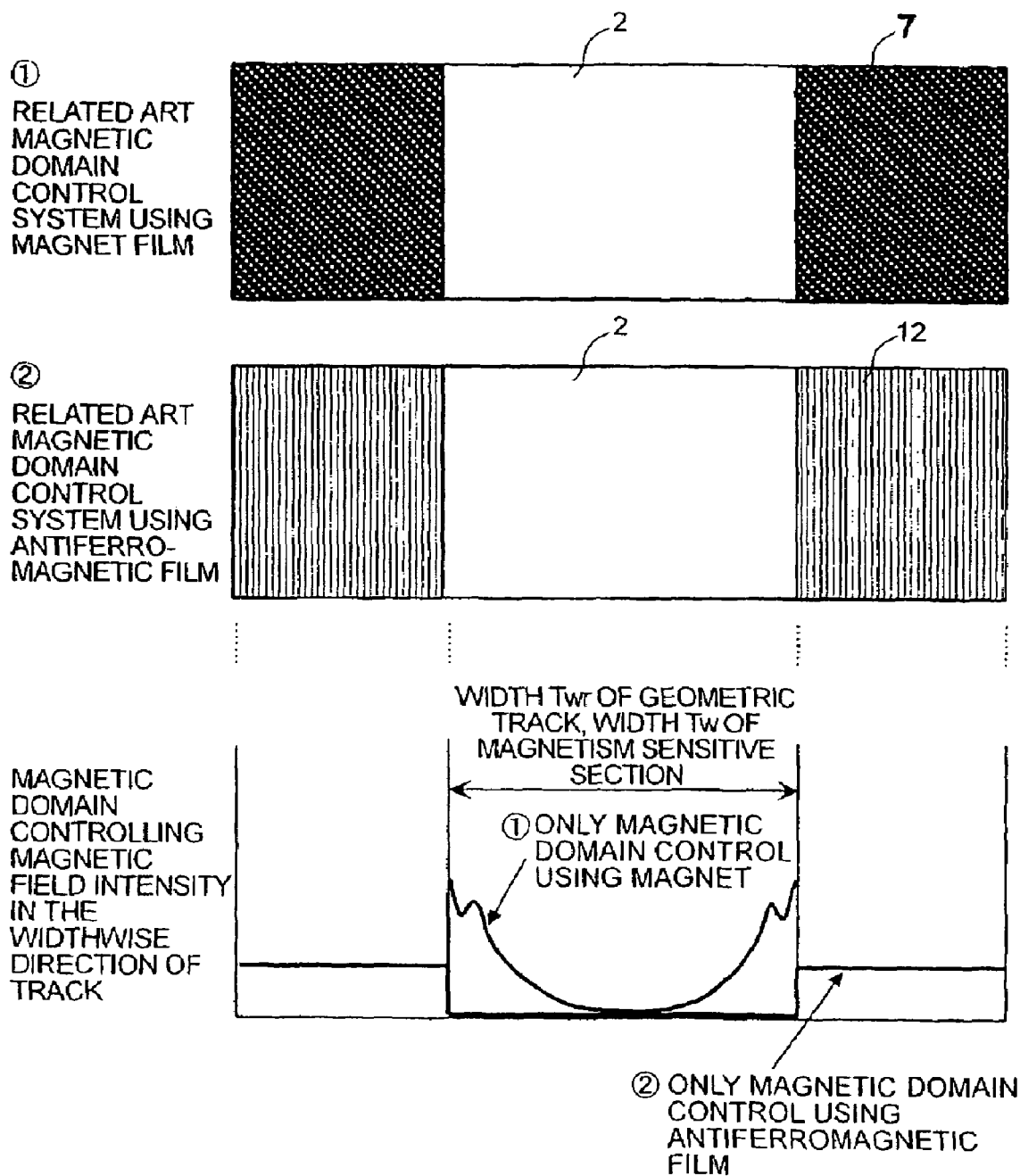
FIG. 19 is an example schematic view of a magnetic domain controlling structure of related art from above, and an example view showing magnetic field distribution for magnetic domain control at a respective free layer position.

FIG. 18 shows a full view of a magnetic head in which a reproducing head having a magnetic domain controlling structure of the invention is incorporated. There is a magnetoresistive stack 36 having magnetoresistive effect which is disposed on a lower shield 34 with an insulator 35 between them, and adjacent to both slanted end surfaces of the magnetoresistive stack is a lamination stack M1; or further, on both end portions of the free layer which is a part of the magnetoresistive stack is a lamination stack M2. There is a lead 10 on lamination stack M1 or M2. On the lead 10, an upper shield 38 is disposed with an insulator 37 between them. On the upper shield 38, an insulator 39 is located and a pole 40a is disposed thereon. A part of the under-pole is a prong shaped structure 40b, and recording operation is carried out by this portion. Over the under-pole 40a, a coil 42 and upper-poles 41a, 41b are disposed. The tip portion of the upper-pole 41a is recessed away from the head surface, bent further toward the inner portion of the head than the tip of the upper-pole 41b. When the upper pole is divided, as into 41a and 41b here, magnetic fluxes generated in the magnetic pole by electric currents flowing in the coil 42 are collected effectively to the tip portion so that recording characteristics may be improved. This recording head may be one for use in perpendicular recording, which employs a main pole and a subpole.

In addition, when a magnetoresistive stack has a TMR effect or CPP-GMR effect, as stated above, it should be appreciated that insulators 35 and 37 may be leads and an insulator may enclose the lamination stack M1. Herewith, by using a reproducing head which has a magnetic domain controlling structure as stated above, it is possible to provide a magnetic head which has high sensitivity, little read drift, and good noise suppression.

Figure 22:
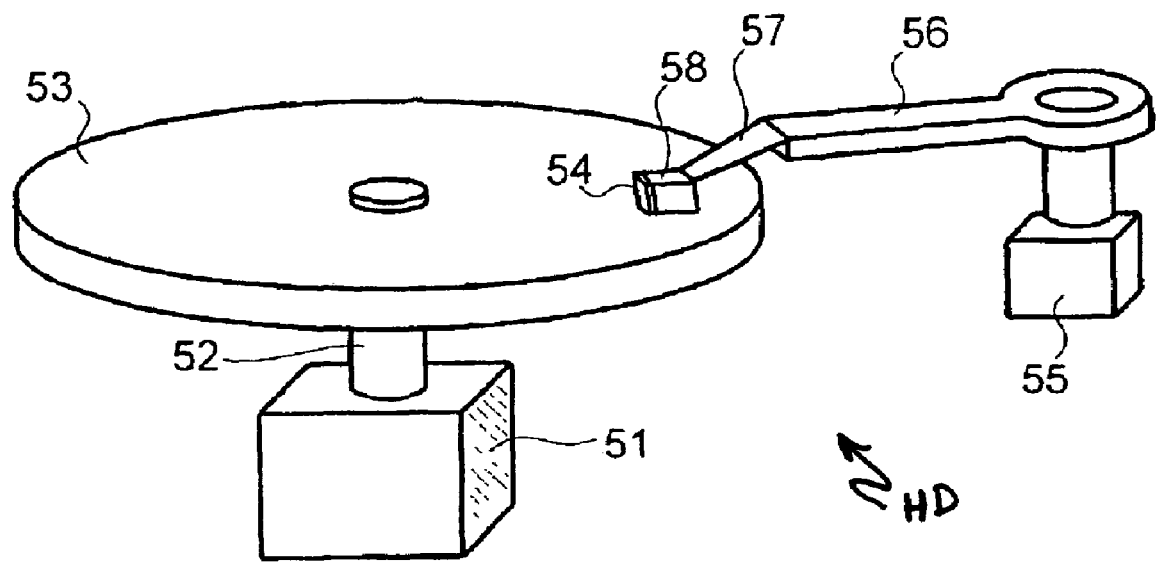
FIG. 22 is an example full view of a magnetic disk apparatus in which a head having a magnetic domain controlling structure of the invention is incorporated.

FIG. 22 is an entire view of a magnetic disk apparatus (e.g., hard disk drive HD) in which a magnetic head having magnetic domain controlling structure of the invention is incorporated. A magnetic recording apparatus has a magnetic disk 53 for recording information which is mounted to a spindle 52 to be rotated by a spindle motor 51, and a suspension 57 is connected to a rotary actuator arm 56 which is driven by a voice coil motor 55, and a slider 58 is held by suspension 57. Slider 58 is designed to be mounted in such a manner that a magnetic head 54 that reads and writes the magnetic data from tracks on the disk is moved toward a disk surface When the magnetic head of the invention is used in the magnetic disk apparatus, the dead zone is eliminated, and rippling of the magnetic field at the end portions of the free layer widthwise in the track is reduced. Thus it becomes possible that recording and reproducing of magnetic data on magnetic disk 53 may be carried out with high output power; a magnetic disk of narrow track width may be used, and a high-density magnetic recording may be realized. Particularly, in case where a soft magnetic film is used as a lamination layer for magnetic domain control of the free layer, crosstalk from adjacent tracks may be prevented by controlling the film thickness of the nonmagnetic film layer, and, therefore, high reliability of the magnetic disk apparatus may be realized at the same time.

By using a magnetic domain control system for the free layer of a magnetoresistive head as in the invention, a magnetoresistive head and a magnetic head are produced which have higher sensitivity to narrow tracks compared to an element using a related art method, with the further advantages of high stability and good suppression of read drift and noise.

Figure 23:
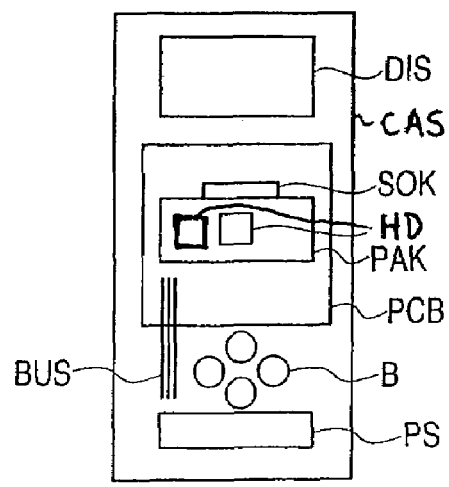
FIG. 23 illustrates example electronic apparatus and/or system arrangements incorporating implementations of the present invention.

FIG. 23 illustrates example electronic apparatus and/or system arrangements that may incorporate implementations of the present invention. More particularly, shown are one or more hard disk drives HD that may incorporate one or more head implementations of the present invention. Ones of such HDs may be part of an electronic package PAK incorporating one or more of the HDs together with supportive components (e.g., integrated circuits, wiring, etc.) onto a substrate such as a printed circuit board (PCB) as a packaged system. The packaged system may be mounted, for example, via a socket SOK onto a system board (e.g., a motherboard system (MB)). The system board may be part of an overall electronic device (e.g., computer, electronic consumer device (e.g., camera), server, communication equipment) or system (e.g., RAID system, vehicle (e.g., automobile, space shuttle)) that may also include one or more of the following items: input (e.g., user) ports B, output ports (e.g., display DIS), a bus or bus portion BUS, a power supply arrangement PS, other ICs, chipsets and/or electrical/electronic/mechanical components, and a case CAS (e.g., plastic or metal chassis).

In concluding, reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment or component, it is submitted that it is within the purview of one skilled in the art to effect such feature, structure, or characteristic in connection with other ones of the embodiments and/or components. Furthermore, for ease of understanding, certain method procedures may have been delineated as separate procedures; however, these separately delineated procedures should not be construed as necessarily order dependent in their performance, i.e., some procedures may be able to be performed in an alternative ordering, simultaneously, etc.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

It should be further understood by those skilled in the art that the foregoing description has been made on embodiments of the invention and that various changes and modifications may be made in the invention without departing from the spirit of the invention and the scope of the appended claims.

What is claimed is:

1. A magneto-resistive effect head comprising:
   an antiferromagnetic layer;
   a pinned layer which is formed on said antiferromagnetic layer and whose magnetizing direction has been fixed;
   a spacer formed on said pinned layer;
   a free layer formed on said spacer; and
   magnetic domain control layers having antiferromagnetic films and magnet layers for performing a magnetic domain control of said free layer;
   wherein said each of said antiferromagnetic films is formed on said free layer;
   wherein said each of magnet layers has at least two magnetic films coupled anti-ferromagnetically through at least one nonmagnetic film;
   a pair of lead layers for supplying a current to said stack of layers; and
   wherein seed layers are formed between said antiferromagnetic films and said lead layers.

2. A magneto-resistive effect head according to claim 1, wherein at least one of said magnetic films is made of one of a CoPt alloy containing Pt of 4 to 30 atom %, a CoCrPt alloy containing Cr of 2 to 15 atom %, CoCrPt—$ZrO_2$, and CoCrPt—$SiO_2$.

3. A magneto-resistive effect head according to claim 1, wherein at least one of said magnetic films is made of a soft magnetic film.

4. A magneto-resistive effect head according to claim 1, comprising:
   antiferromagnetic layers formed close on one of said magnetic films to fix a magnetizing direction of said one of magnetic films.

5. A magneto-resistive effect head comprising:
   a stack, which has a trapezoidal shape with end portions in a track direction,
   an antiferromagnetic layer;
   a pinned layer which is formed on said antiferromagnetic layer and whose magnetizing direction has been fixed;
   a spacer formed on said pinned layer;
   a free layer formed on said spacer;
   soft magnetic domain control layers arranged adjacent said end portions of said stack;
   antiferromagnetic films formed on said soft magnetic domain control layers; and
   magnet layers arranged on both sides of said soft magnetic domain control layers opposite to sides of said end portions of said stack;
   wherein said each of magnet layers has at least two magnetic films coupled anti-ferromagnetically through at least one nonmagnetic film.

6. A magneto-resistive effect head according to claim 5, comprising:
   a pair of lead layers for supplying a current to said stack of layers;
   wherein seed layers are formed between said antiferromagnetic films and said lead layers.

7. A magneto-resistive effect head according to claim 6, wherein at least one of said magnetic films is made of one of a CoPt alloy containing Pt of 4 to 30 atom %, a CoCrPt alloy containing Cr of 2 to 15 atom %, CoCrPt—$ZrO_2$, and CoCrPt—$SiO_2$.

8. A magneto-resistive effect head according to claim 6, wherein at least one of said magnetic films is made of a soft magnetic film.

9. A magneto-resistive effect head according to claim 6, comprising:
antiferromagnetic layers formed close to on one of said magnetic films to fix a magnetizing direction of said one of magnetic films.

10. A magneto-resistive effect head comprising:
a stack, which has a trapezoidal shape with end portions in a track direction,
an antiferromagnetic layer;
a pinned layer which is formed on said antiferromagnetic layer and whose magnetizing direction has been fixed;
a spacer formed on said pinned layer;
a free layer formed on said spacer;
antiferromagnetic films formed on said free layer so that said antiferromagnetic films exits only a region of a specific length of said end portions of said stack; and
magnet layers arranged adjacent said end portions of a stack;
wherein said each of magnet layers has at least two magnetic films coupled antiferromagnetically through at least one nonmagnetic film;
first lead layers formed over said antiferromagnetic films; and
second lead layers formed over said magnet layers;
wherein each of said first lead layers is coupled with each of said second lead layers.

11. A magneto-resistive effect head according to claim 10, wherein at least one of said magnetic films is made of a soft magnetic film.

12. A magneto-resistive effect head according to claim 10, comprising:
antiferromagnetic layers formed close to on one of said magnetic films to fix a magnetizing direction of said one of magnetic films.

13. A magneto-resistive effect head according to claim 10, comprising:
seed layers formed between said antiferromagnetic films and said first lead layers and between said magnet layers and said second lead layers.

14. A magneto-resistive effect head according to claim 10, wherein at least one of said magnetic films is made of one of a CoPt alloy containing Pt of 4 to 30 (check if 30 or 80) atom %, a CoCrPt alloy containing Cr of 2 to 15 atom %, CoCrPt—$ZrO_2$, and CoCrPt—$SiO_2$.

15. A magneto-resistive effect head according to claim 10, wherein at least one of said magnetic films is made of a soft magnetic film.

16. A magneto-resistive effect head according to claim 10, comprising:
antiferromagnetic layers formed close to on one of said magnetic films to fix a magnetizing direction of said one of magnetic films.

17. A magneto-resistive effect head according to claim 10, comprising:
seed layers formed between said antiferromagnetic films and said lead layers and between said magnetic layers and said lead layers.

18. A magneto-resistive effect head according to claim 10, wherein at least one of said magnetic films is made of one of a CoPt alloy containing Pt of 4 to 30 (check if it is 30 or 80) atom %, a CoCrPt alloy containing Cr of 2 to 15 atom %, CoCrPt—$ZrO_2$, and CoCrPt—$SiO_2$.

* * * * *